(12) United States Patent
Wakabayashi et al.

(10) Patent No.: US 9,024,992 B2
(45) Date of Patent: May 5, 2015

(54) VIBRATING ELEMENT, OPTICAL SCANNING DEVICE, AND IMAGE FORMING DEVICE AND IMAGE PROJECTION DEVICE USING SAME

(75) Inventors: Takayuki Wakabayashi, Chichibu (JP); Naruki Suzuki, Chichibu (JP); Katsumi Arai, Chichibu (JP); Yaomin Zhou, Chichibu (JP)

(73) Assignee: Canon Denshi Kabushiki Kaisha, Saitama (JP)

( * ) Notice: Subject to any disclaimer, the term of this patent is extended or adjusted under 35 U.S.C. 154(b) by 0 days.

(21) Appl. No.: 13/978,192

(22) PCT Filed: Jan. 4, 2012

(86) PCT No.: PCT/JP2012/000015
§ 371 (c)(1),
(2), (4) Date: Jul. 3, 2013

(87) PCT Pub. No.: WO2012/093653
PCT Pub. Date: Jul. 12, 2012

(65) Prior Publication Data
US 2013/0286151 A1   Oct. 31, 2013

(30) Foreign Application Priority Data

Jan. 7, 2011   (JP) ................................ 2011-002390

(51) Int. Cl.
*B41J 2/435*   (2006.01)
*B41J 27/00*   (2006.01)
(Continued)

(52) U.S. Cl.
CPC .............. *H02K 33/00* (2013.01); *G02B 7/1821* (2013.01); *G02B 26/105* (2013.01); *H02K 33/16* (2013.01);
(Continued)

(58) Field of Classification Search
USPC .................................. 347/237, 247, 242, 263
See application file for complete search history.

(56) References Cited

U.S. PATENT DOCUMENTS 7,095,156 B2   8/2006   Yoda
7,161,275 B2   1/2007   Yoda
(Continued)

FOREIGN PATENT DOCUMENTS

CN   1612064 A   5/2005
CN   101082696 A   12/2007
(Continued)

OTHER PUBLICATIONS

Notification of Transmittal of Translation of the International Preliminary Report on Patentability and the Written Opinion of the International Searching Authority dated Jul. 18, 2013, in related PCT International Application No. PCT/JP2012/000015.
(Continued)

*Primary Examiner* — Sarah Al Hashimi
(74) *Attorney, Agent, or Firm* — Fitzpatrick, Cella, Harper & Scinto

(57) ABSTRACT

The oscillation element according to the present invention includes a torsion bar mounted on a base, and an oscillating member having a light reflection surface for reflecting light from a light source, which is fixed on the torsion bar protruding from the base. The oscillating member oscillates about a longitudinal axis of the torsion bar with an elastic deformation of the torsion bar, thereby deflecting the light that reflects at the light reflection surface in a direction intersecting the longitudinal axis. The oscillating member has two plates that are joined together so as to sandwich the torsion bar. On joining surfaces of the plates are provided with grooves for receiving the torsion bar, respectively. The plates have a symmetrical shape that the longitudinal axis serves as the axis of symmetry.

22 Claims, 35 Drawing Sheets

(51) Int. Cl.
    *H02K 33/00* (2006.01)
    *G02B 7/182* (2006.01)
    *G02B 26/10* (2006.01)
    *H02K 33/16* (2006.01)
    *B41J 2/44* (2006.01)
    *G03B 21/28* (2006.01)
    *H02K 15/00* (2006.01)
    *H04N 1/113* (2006.01)

(52) U.S. Cl.
    CPC . *B41J 2/44* (2013.01); *G02B 26/10* (2013.01); *G03B 21/28* (2013.01); *H02K 15/00* (2013.01); *H04N 1/1135* (2013.01)
    USPC ............ 347/247; 347/237; 347/263; 347/242

(56) References Cited

U.S. PATENT DOCUMENTS

| | | | |
|---|---|---|---|
| 7,656,570 B2 | 2/2010 | Torashima et al. | |
| 8,305,674 B2 * | 11/2012 | Miyagawa et al. | ......... 359/224.1 |
| 8,610,987 B2 * | 12/2013 | Nakamura et al. | ......... 359/224.1 |
| 2004/0125428 A1 * | 7/2004 | Kobayashi | .................... 359/216 |
| 2006/0171728 A1 | 8/2006 | Ichimura et al. | |
| 2007/0144867 A1 | 6/2007 | Torashima et al. | |
| 2007/0279720 A1 | 12/2007 | Torashima et al. | |
| 2010/0214636 A1 | 8/2010 | Miyagawa et al. | |
| 2011/0019256 A1 | 1/2011 | Miyagawa et al. | |
| 2012/0249804 A1 | 10/2012 | Suzuki et al. | |

FOREIGN PATENT DOCUMENTS

| | | |
|---|---|---|
| CN | 102666367 A | 9/2012 |
| JP | 06-027399 | 2/1994 |
| JP | 10-003055 | 1/1998 |
| JP | 2004-301555 | 10/2004 |
| JP | 2007-183574 | 7/2007 |
| JP | 2007-322505 | 12/2007 |
| JP | 2007322505 A * | 12/2007 |
| JP | 2009-134243 | 6/2009 |
| JP | 2009-163198 | 7/2009 |
| WO | 2011/074256 A1 | 6/2011 |

OTHER PUBLICATIONS

Notice of Allowance—Chinese Patent Application No. 201280004719.1, Chinese Patent Office, issued Feb. 27, 2015.

* cited by examiner

VIBRATING ELEMENT, OPTICAL SCANNING DEVICE, AND IMAGE FORMING DEVICE AND IMAGE PROJECTION DEVICE USING SAME

TECHNICAL FIELD

The present invention relates to an oscillation element, provided by employing torsion bar resonance, an optical scanning device therefor, and an image forming device and an image projection device, into which the optical scanning device is incorporated.

BACKGROUND ART

An optical scanning device that performs optical scanning by oscillating a reflector at a high speed, by using the resonance of a vibration system instead of by using a rotating reflector, such as a polygon mirror that is provided for an optical scanner, has been proposed in patent literature 1 and in patent literature 2. An oscillating member or an electrometer using the same operating principle is also proposed in patent literature 3.

An optical scanning element, which serves as an oscillation element included in such an optical scanning device, or in an electrometer, generally includes: a plate-shaped oscillating member; a torsion bar to which the oscillating member is fixed; and drive means for oscillating the oscillating member about the longitudinal axis of the torsion bar. Further, the drive means includes a magnet, which is attached with the oscillating member, and a coil for passing an alternating current, located opposite the magnet, and when the alternating current is supplied to the coil, the oscillating member is oscillated with an elastic deformation of the torsion bar. Therefore, a resonance phenomenon, due to the elastic deformation of the torsion bar, can be employed to oscillate the oscillating member, with a large deflection angle, using only a comparatively small amount of electric power.

It should be noted that the "deflection angle" represents an angle formed by two oscillation ends, at which the oscillation direction of the oscillating member is changed in a case wherein the oscillating member is oscillated about the longitudinal axis of the torsion bar.

CITATION LIST

Patent Literature

PTL 1: Japanese Patent Laid-Open No. H06-027399 (1994)
PTL 2: Japanese Patent Laid-Open No. H10-003055 (1998)
PTL 3: Japanese Patent Laid-Open No. 2004-301555

SUMMARY OF INVENTION

Technical Problem

In patent literature 1, a single plane mirror is provided by applying a mirror coating to one side of each of two plane glass plates having the same thickness. Further, the plane mirror is oscillated about the axis that passes the mirror coated faces in order to prevent reflection positions from being shifted due to the oscillations of the plane mirror. According to the method proposed in patent literature 1, light is not reflected from the surface of the plane glass plate, but enters within the plane glass plate and is reflected at the mirror coated portion, and thereafter, the light is output from the surface of the plane glass plate. As a result, the plane glass plates must be optically transparent, and essentially, an optically non-transparent material, such as metal, cannot be used. Furthermore, the reflection of light at the surface of the plane glass plate must be restricted, or chromatic correction will be required in a case wherein the light is emitted from a multicolor light source. Moreover, some positioning means is required to align the center axis of the torsion bar with the center axis of the plane mirror that passes the mirror coated portions.

Patent literature 2 provides a structure wherein a magnet is mounted on a torsion bar by means of a fixing member, and the surface of the magnet is also used as a light reflection surface. However, since the common barycenter of the fixing member and the magnet that is bonded to the fixing member is positioned away from the center axis of the torsion bar, there is a case wherein abnormal vibration may occur on the light reflection surface that is the surface of the magnet, so that light can not be emitted in a desired scanning direction.

One object of the present invention is to provide an oscillation element which can effectively prevent the occurrence of abnormal vibrations on an oscillating member provided on a torsion bar, and an optical scanning device that employs the oscillation element.

Another object of the present invention is to provide an oscillation element that can efficiently oscillate an oscillating member even in a case wherein the straightness of a torsion bar is poor, and an optical scanning device therefor.

Yet another object of the present invention is to provide an image forming apparatus and an image projection apparatus that are equipped with such an optical scanning device, and that are compact and provide high performances.

A further object of the present invention is to provide an oscillation element, for which desired straightness is ensured for a torsion bar and the magnitude of a deflection angle can be increased, an optical scanning device employing the oscillation element, and an image forming apparatus and an image projection apparatus that include such an optical scanning device.

A yet further object of the present invention is to provide an oscillation element, with which the assembly of an oscillation element is simplified and the positioning accuracy for components can be increased. Moreover, another object of the present invention is to provide an optical scanning device that performs stable optical scanning, and an image forming apparatus and an image projection apparatus that employ the optical scanning device.

Solution to Problem

A first aspect of the present invention is an oscillation element comprising a base, a torsion bar protruding from the base, and an oscillating member arranged on a side of the torsion bar away from the base, the oscillating member having two same shaped plates that are joined together so that the two plates sandwich the torsion bar.

In the oscillation element according to the first aspect of the present invention, the oscillating member may have a light reflection surface for reflecting light emitted from a light source, the light reflection surface being extended in parallel to a longitudinal axis of the torsion bar. The oscillating member may oscillate about the longitudinal axis with an elastic deformation of the torsion bar, thereby deflecting the light reflected on the light reflection surface of the oscillating member in a direction intersecting the longitudinal axis of the torsion bar.

The two plates may have grooves respectively provided on joining surfaces of the two plates for receiving the torsion bar, and the two plates may have a symmetrical shape that the longitudinal axis of the torsion bar serves as the axis of symmetry.

The light reflection surface of the oscillating member may be provided on a side opposite the joining surface of at least one of the two plates.

The oscillation element may further comprise a gravity center compensation member for compensating the center of gravity of the oscillating element and the center of gravity of the torsion bar.

The torsion bar may be formed by drawing or ironing.

The oscillating member may have a notch portion provided therein as a reference for mounting a magnet.

A second aspect of the present invention is an oscillation element comprising a torsion bar, an oscillating member fixed to the torsion bar, first magnetic field generation means fixed to the oscillating member or the torsion bar, and second magnetic field generation means for generating a magnetic field corresponding to a magnetic field generated by the first magnetic field generation means, so that the torsion bar is deformed and the oscillating member is oscillated, wherein the torsion bar has a flat portion that is formed on a part of a straight wire rod having a definite shape in cross section, the oscillating member being joined with the flat portion.

According to the present invention, the second magnetic field generation means deflects the torsion bar by generating a magnetic field that corresponds to a magnetic field generated by the first magnetic field generation means, and the oscillating member is rotated with an elastic deformation of the torsion bar.

A third aspect of the present invention is a method for manufacturing the oscillation element according to the second aspect of the present invention comprising the steps of forming a flat portion on a part of a surface of a straight wire rod having a definite shape in cross section, and joining an oscillating member with the flat portion that is formed on a part of the surface of the wire rod.

In the method for manufacturing the oscillation element according the third aspect of the present invention, the flat portion may have a rotation symmetrical shape with respect to a longitudinal axis of the wire rod.

The flat portion may have a pair of flat surfaces being parallel to the longitudinal axis of the wire rod.

The step of forming the flat portion may include a step of intermittently forming a plurality of flat portions on the wire rod along the longitudinal direction of the wire rod. The method may further comprise a step of cutting the wire rod with a right angle relative to the longitudinal axis at a longitudinal center portion of at least one of the plurality of the flat portions.

The flat portion may be located at one end of the wire rod along the longitudinal direction, or at an intermediate portion in the longitudinal direction.

The step of forming the flat portion may include a deformation processing or an elimination processing to the wire rod. More particularly, the flat portion may be shaped by press working such as swaging, grinding, cutting, wet etching, drawing or ironing.

The method for manufacturing the oscillation element may further comprise a step of giving an age hardening treatment for the portions of the flat surfaces.

A fourth aspect of the present invention is an optical scanning device comprising an oscillation element according to the first or second aspect of the present invention, a light source for emitting light to a light reflection surface on an oscillating member of the oscillation element, and drive means for oscillating the oscillating member of the oscillation element about a longitudinal axis of a torsion bar.

According to the present invention, due to the operation of the drive means, the oscillating member is oscillated about the longitudinal axis of the torsion bar, and the torsion bar resonates and repeats elastic torsional deformation. As a result, light emitted from the light source is reflected from the light reflection surface of the oscillating member to perform scanning.

In the optical scanning device according to the fourth aspect of the present invention, the drive means may include a magnet integrally mounted with the oscillating member, and a coil for passing an alternating current, the coil being located opposite the magnet, and wherein two plates have grooves respectively provided on joining surfaces of the two plates for receiving or holding the magnet, the grooves being symmetrical so that the longitudinal axis of the torsion bar serves as the axis of symmetry.

Magnet poles of the magnet may be extended perpendicular to the longitudinal axis of the torsion bar, and parallel to the light reflection surface of the oscillating member.

A fifth aspect of the present invention is an image forming apparatus comprising an optical scanning device according to the fourth aspect of the present invention, and an image forming medium that is irradiated with light emitted from the light source of the optical scanning device, via the light reflection surface on the oscillating member of the oscillation element of the optical scanning device.

According to the present invention, light emitted from the light source is applied, via the light reflection surface of the oscillating member of the oscillation element, to the image forming medium.

A sixth aspect of the present invention is an image projection apparatus comprising an optical scanning device according to the fourth aspect of the present invention, a light deflector for deflecting, in a direction parallel to a longitudinal axis of a torsion bar, light that is emitted from the light source and is reflected on the light reflection surface on the oscillating member of the oscillation element of the optical scanning device, and a screen irradiated by the light deflected by the light deflector.

According to the present invention, light emitted from the light source is reflected at the light reflection surface of the oscillating member of the oscillation element, and the reflected light that is changed to the scanning state through oscillation of the oscillating member, is deflected, by the light deflector, in a direction that intersects the scanning direction, and is applied to the screen.

Advantageous Effects of Invention

According to the oscillation element of the present invention, since the oscillating member includes two plates having the same shape, which are bonded together by sandwiching the torsion bar in between, the occurrence of abnormal vibrations at the oscillating member can be effectively prevented.

Further, in a case wherein the two plates have grooves respectively provided on joining surfaces of the plates for receiving the torsion bar, and wherein these plates have a symmetrical shape that the longitudinal axis of the torsion bar serves as the axis of symmetry, the oscillating member can be accurately fixed to the torsion bar. Furthermore, since machining is performed for the receiving grooves that are formed in the joining surfaces of the two plates, degrading of the flatness of the light reflection surface can be suppressed. Moreover, the oscillating member can be efficiently oscillated without causing abnormal vibrations.

In a case wherein the light reflection surface of the oscillating member is provided for the surface opposite the joining surface of at least one of the two plates, the side having a more favorable flatness can be employed as a light reflection surface.

Since the optical scanning device of the present invention includes the oscillation element of this invention, resonance of the oscillating member can efficiently occur.

Further, in a case wherein grooves for fitting or holding the magnet of the drive means are provided on the joining surfaces of the two plates, symmetrically along the longitudinal axis of the torsion bar as the axis of symmetry, the location of the center of gravity of the oscillating member that includes the magnet, can be positioned along the longitudinal axis of the torsion bar. Furthermore, the positioning of the magnet can be correctly performed, and deterioration due to exposure of the magnet to the air can be suppressed. Especially in a case wherein the poles of the magnet are extended perpendicular to the longitudinal axis of the torsion bar and parallel to the light reflection surface of the oscillating member, the distance at which the oscillating member is deflected from a non-load state to one side, and the distance of deflection to the other side can be the same.

Since the image forming apparatus according to the present invention includes the optical scanning device of this invention and an image forming medium that is irradiated, via the light reflection surface of the oscillating member of the oscillation element of the optical scanning device, by light that has been emitted from the light source of the optical scanning device, a small and high-performance image forming apparatus can be provided.

Since the image projection apparatus according to the present invention includes the optical scanning device of this invention and the optical deflecting device that applies light, emitted from the light source, to a screen by deflecting the light in a direction parallel to the longitudinal axis of the torsion bar, a small and high-performance image projection apparatus can be provided.

DESCRIPTION OF EMBODIMENTS

One embodiment for which an image forming apparatus according to the present invention is applied for a laser beam printer (hereinafter referred to as an LBP) will now be described in detail, while referring to FIGS. 1 to 10. However, it should be noted that the present invention is not limited to this embodiment, and the structure for another embodiment can be employed together, as needed, or a different arbitrary structure that is cited in attached claims and that belongs to the spirit of the present invention can be employed appropriately.

Figure 1:
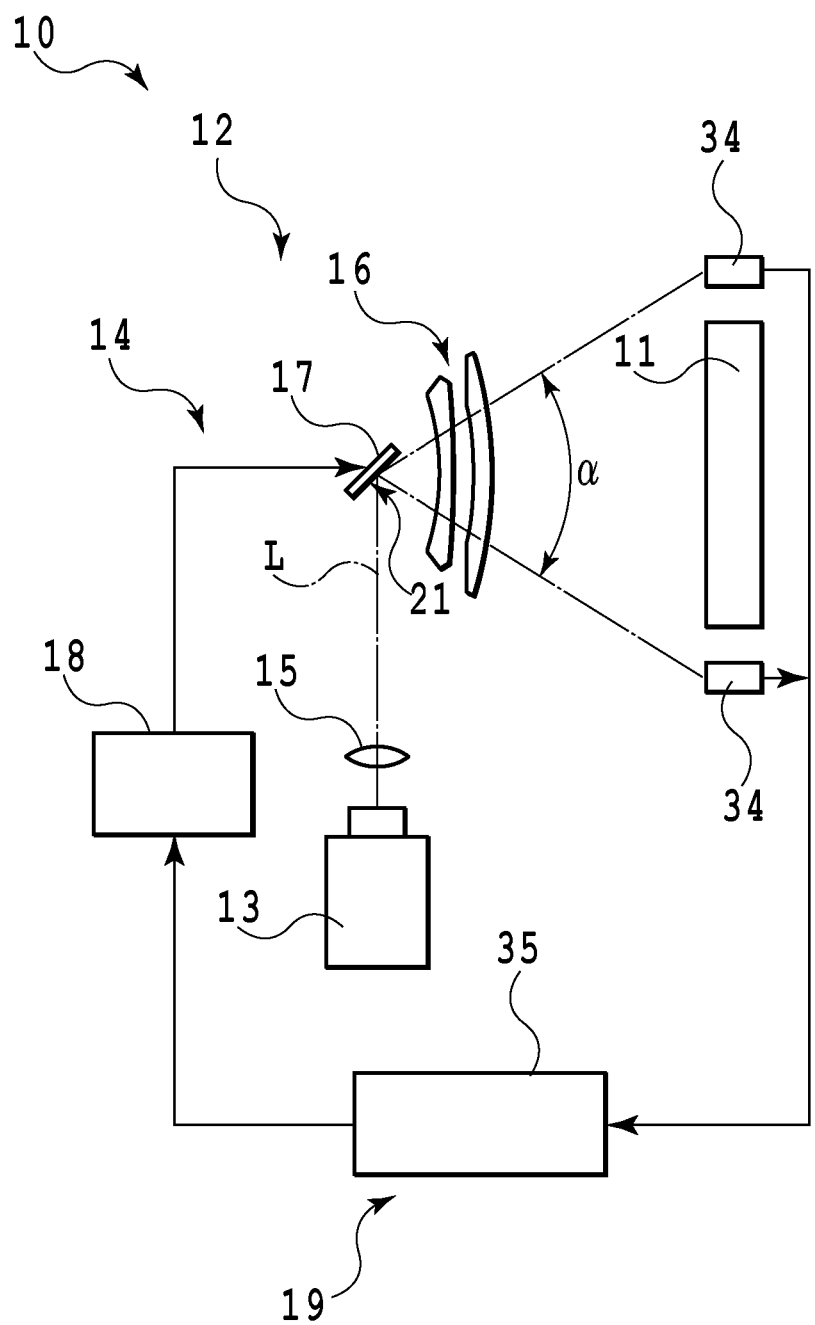
FIG. 1 shows a schematic diagram of one embodiment where an image forming apparatus according to the present invention is applied for an LBP.
Figure 2:
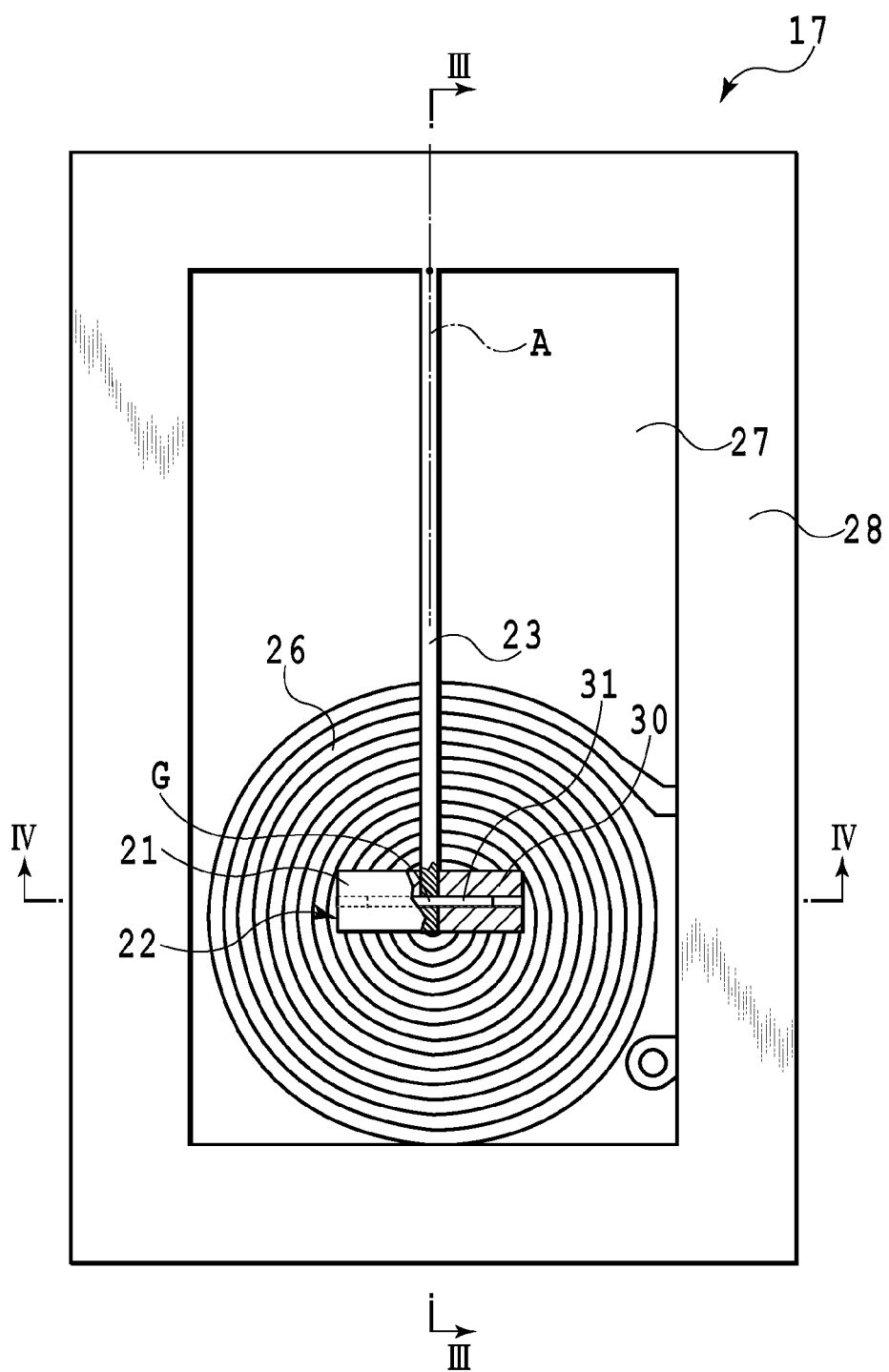
FIG. 2 shows a plan view of one embodiment for an oscillation element in an optical scanning device according to the present invention that is incorporated in the LBP in FIG. 1.
Figure 3:
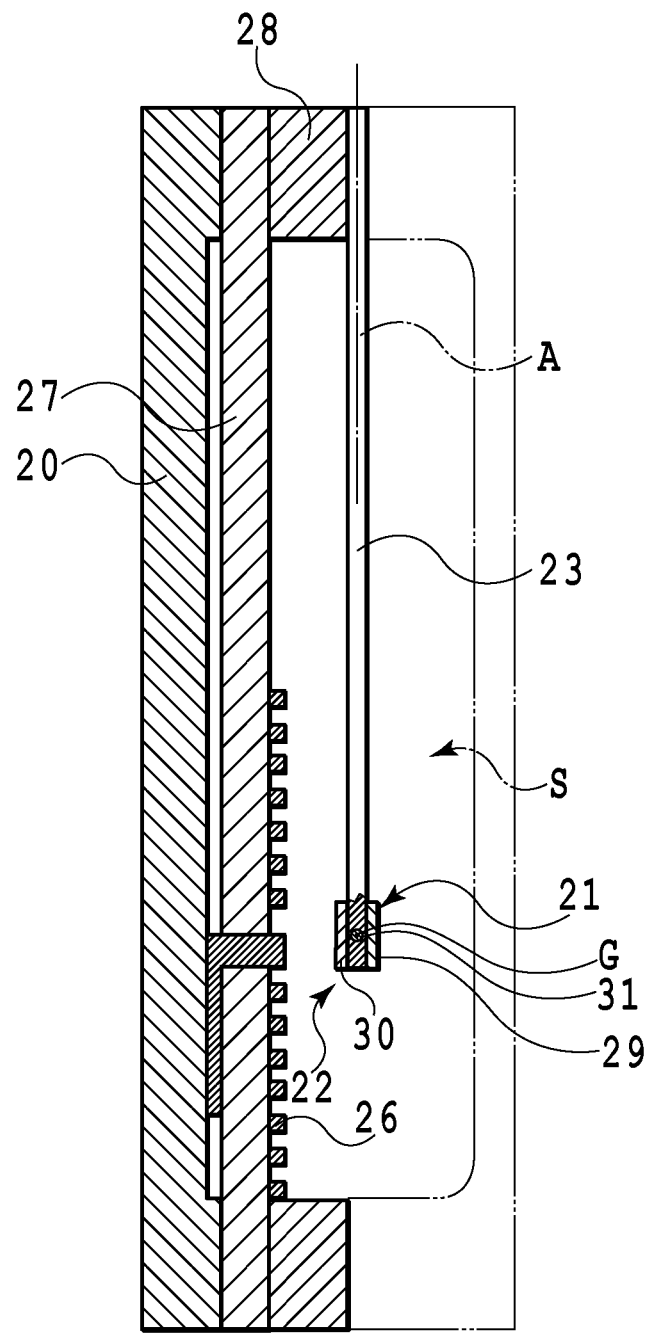
FIG. 3 shows a sectional view taken along arrows III-III in FIG. 2.
Figure 4:
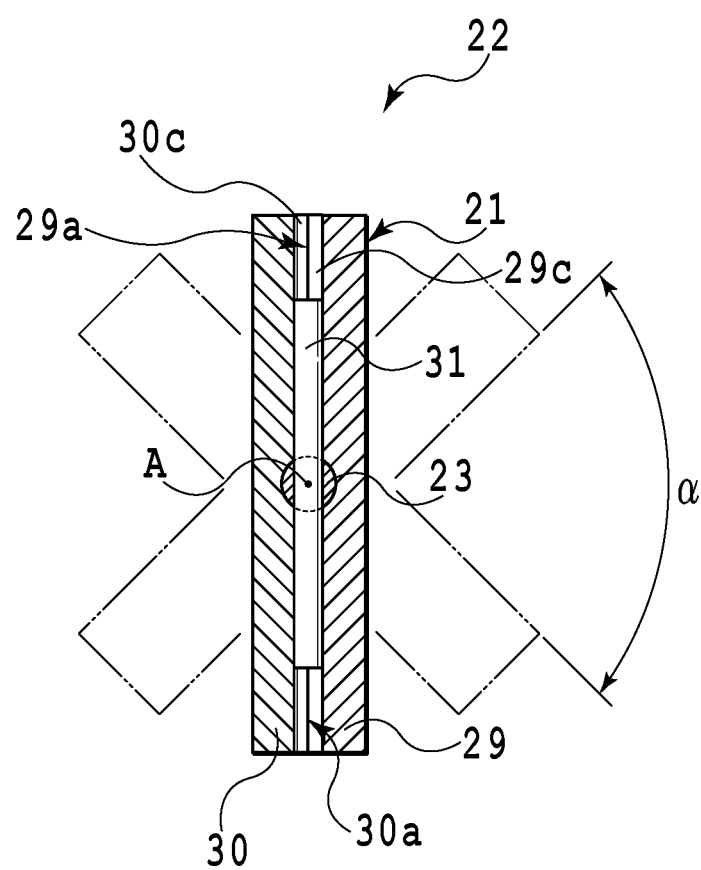
FIG. 4 shows an enlarged sectional view taken along arrows IV-IV in FIG. 2.
Figure 5:
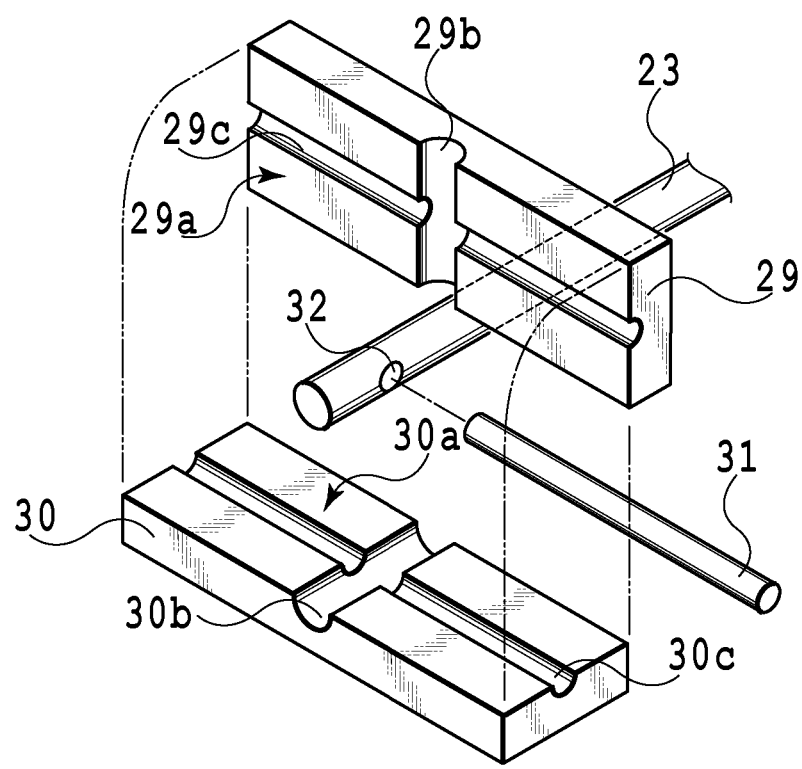
FIG. 5 shows an exploded view of a portion of oscillating members in the oscillation element shown in FIG. 2.

The exposure unit of the LBP for this embodiment is schematically illustrated in FIG. 1; the main portion of an oscillation element, which is included in the optical scanning device of the LBP, is extracted and shown in FIG. 2; the sectional view of the main portion taken along arrows III-III in FIG. 2 is shown in FIG. 3; and the enlarged sectional view taken along arrows IV-IV in FIG. 2 is shown in FIG. 4. Furthermore, the exploded view of the main portion of the oscillation element is shown in FIG. 5. Specifically, an LBP 10 in this embodiment includes: a photosensitive drum 11, which serves as an image forming medium in the present invention; and an exposure unit 12, which is to form an electrostatic latent image on the photosensitive drum 11 based on image data. In addition to the photosensitive drum 11 and the exposure unit 12, the LBP 10 in this embodiment also includes a sheet feeding unit, a charging unit, a toner supplying unit, a transferring unit, a fixing unit and a sheet conveying unit (none of them shown), all of which are well known.

The exposure unit 12 includes an optical scanning device 14, which has a laser oscillator 13 that emits the pulse of a laser beam L corresponding to image data, collimation optics 15 and an fθ lens 16, both of which are well known.

The optical scanning device 14 includes the previous described laser oscillator 13, an optical scanning element 17, which performs scanning by employing the laser beam L emitted from the laser oscillator 13, an element driver 18 that drives the optical scanning element 17, and a controller 19 that controls the operation of the element driver 18.

The optical scanning element 17, which serves as an oscillation element in the present invention, includes: a base 20; an oscillating member 22, which has a light reflection surface 21 through which the laser beam L, emitted from the laser source 13, etc., enters; a torsion bar 23 that supports the oscillating member 22; and a cover member 25. A substrate 27 that has a spiral-shaped sheet coil 26, which is a part of the element driver 18 that serves as drive means in this invention, is mounted on the base 20 for this embodiment. A frame member 28 that serves as the peripheral edge of the base 20 is aligned with the peripheral edge of the base 27, and the two members are integrally bonded. The optically transparent cover member 25 is aligned and integrally bonded with the frame member 28, and an internal space S, thus defined, is held airtight in a reduced pressure state. In the internal space S defined by the base 20 and the cover member 25, there are the torsion bar 23 having a rod shape and extended like a beam from the base 20, the oscillating member 22 and the substrate 27, where the above described sheet coil 26 is formed as apart of the element driver 18. Since the internal space S is held airtight under the reduced pressure by employing the cover member 25, compared with when being under normal pressure, the characteristics of the vibrating system that includes the oscillating member 22 as a main component can be improved. Especially, since the effect of the air resistance is reduced, the vibration characteristic can be more improved.

The torsion bar 23 that supports the oscillating member 22 is extended along an axis A that is perpendicular to the rotational axis of the photosensitive drum 11 (hereinafter, this axis is referred to as the longitudinal axis of the torsion bar; however, in the example in the drawing, the axis is perpendicular to the plane of paper in FIG. 1). The proximal end of the torsion bar 23 is fixed, like a cantilever, between the frame member 28 of the base 20 and the cover member 25, and the distal end is extended from the frame member 28 to near the center portion of the sheet coil 26 that is provided on the substrate 27. The oscillating member 22 fixed at the distal end of the torsion bar 23 can be oscillated, while being flexibly bent (distorted), about the longitudinal axis of the torsion bar 23.

Here, the oscillating member 22 in this embodiment includes, for example, two rectangular plates 29 and 30 having the same shape (specifically the same shape of the same size), which are adhered together by sandwiching the torsion bar 23, and these two plates 29 and 30 have a symmetrical shape that the longitudinal axis A of the torsion bar 23 serves as the axis of symmetry. Joining surfaces 29a and 30a of the two plates 29 and 30 are set parallel to the longitudinal axis A of the torsion bar 23, and are adhered to the torsion bar 23 so as to be substantially parallel to the surface of the sheet coil 26 that is provided on the substrate 27. Therefore, the surface of one of the plates, e.g., the plate 29 that faces the cover member 25, is provided as the light reflection surface 21, which can be formed by vapor deposition of aluminum, gold, etc., on the surface of the plate 29. Further, a plate member for which mirror finish has been performed in advance may be adhered to the surface of the plate 29, and the resultant surface may be operated as the light reflection surface 21. When the same finishing as for the plate 29 is performed for the surface of the other member, i.e., the plate 30, the weights of the two plates 29 and 30 are matched to keep a balance, and more stable oscillations can be provided for the vibration system that includes the oscillating member 22. Furthermore, when the same process is provided for the surfaces of the two plates 29 and 30, the surface of one of the plates 29 and 30 having better flatness can be selected as the light reflection surface 21. The surfaces of the two plates 29 and 30 may also be employed independently as light reflection surfaces. The light reflection surface 21 is set perpendicular to an imaginary plane that includes the longitudinal axis A of the torsion bar, extended linearly along the longitudinal direction of the torsion bar 23, and the center of gravity G of the oscillating member 22, which is fixed to the torsion bar 23. Therefore, this imaginary plane is a plane parallel to the plane of paper in FIG. 3.

As described above, in order to increase the surface reflectance of the light reflection surface 21 provided on the surface of the first plate 29 included in the oscillating member 22, a thin layer made of aluminum, gold, etc., can be formed by vacuum vapor deposition. Another thin layer of metal, such as titanium, cupper or silver, may also be employed. However, the surface of the metal thin layer is comparatively easily scratched, and oxidation of the metal tends to occur, depending on the metal that is used, and when the light reflection surface 21 is formed of only a metal thin layer, the reflectance would be gradually reduced. Therefore, sometimes it is effective for a metal protective layer to be additionally formed to protect the metal thin layer. Further, there is a possibility that a desired reflectance for the light reflection surface 21 cannot be obtained by using only a single metal layer. Therefore, when a metal protective layer is provided also as an enhanced reflecting layer to increase the reflectance of the entire light reflection surface 21, the metal thin layer can be protected, and also the light reflection efficiency can be increased. Such a metal protective layer having an enhanced reflection property can be, for example, constructed by multilayering a low-refractive-index dielectric material and a high-refractive-index dielectric material. A well known example low-refractive-index dielectric material is $SiO_2$ or $MgF_2$, and an example high-refractive-index dielectric material can be $TiO_2$, $Nb_2O_5$, $ZrO_2$ or $Ta_2O_5$. Further, it is also effective for a dielectric material having an intermediate refractive index, such as $Al_2O_3$, to be additionally laminated to these materials. It should be noted that the materials for the metal protective layer having an enhanced reflecting property need not be limited to these materials, and appropriate optimal materials can be selected.

Further, a magnet 31 having a round bar shape, which serves as a part of the element driver 18, is embedded in the oscillating member 22. In this embodiment, a hole 32 into which the round bar magnet 31 is inserted, is formed in the distal end of the torsion bar 23, in a direction perpendicular to the longitudinal direction of the torsion bar 23, and the magnet 31 is inserted into the hole 32. The direction of the magnet 31 is regulated, so that a pair of magnet poles of the magnet 31 are arranged perpendicular to the longitudinal axis A of the torsion bar 23.

Torsion bar receiving grooves 29b and 30b, along which the torsion bar 23 is inserted, and magnet receiving grooves 29c and 30c, to which the magnet 31 is to fit, are provided in advance on the joining surfaces 29a and 30a of the two plates 29 and 30 that constitute the oscillating member 22. Needless to say, the two grooves 29b, or 30b, and 29c, or 30c, which have a semicircular shape in cross section, orthogonally intersect each other in the center portion of the joining surface 29a, or 30a, and are located at symmetrical positions so that the longitudinal axis A of the torsion bar 23 serves as the axis of symmetry. Since the receiving grooves 29b, 30b, 29c and 30c are provided, the positions of the torsion bar 23, the oscillating member 22 and the magnet 31 can be correctly determined, and the occurrence of abnormal vibrations of the vibration system provided with the torsion bar 23 can be prevented.

The element driver 18 in this embodiment includes: the magnet 31, which is fixed to the oscillating member 22 and/or the torsion bar 23; the sheet coil 26, which is provided on the base 20 side so as to be located opposite the magnet 31 with a gap between them; and a power source (not shown). The power source of the element driver 18 supplies, to the sheet coil 26, an alternating current in consonance with the resonant frequency of the vibration system that includes the torsion bar 23, the oscillating member 22 and the magnet 31. Therefore, the light reflection surface 21 of the oscillating member 22 can oscillate about the longitudinal axis A of the torsion bar with the resonant frequency of the vibration system, i.e., can oscillate under the resonant condition. Therefore, the amplitude of the vibration system, i.e., the degree of a deflection angle $\alpha$ at the light reflection surface 21 of the oscillating member 22, can be adjusted based on the amount of an electric current supplied to the sheet coil 26. The waveform of the alternating current may be not only the sine wave, but also the triangular wave, or the pulse output. Further, instead of the above described sheet coil 26, a coil that includes a soft magnetic material used as a yoke may be used. Moreover, a pair of magnetic field application means may also be arranged to sandwich the oscillating member 22, so long as these means will not interfere with the light reflection surface 21 of the oscillating member 22.

The controller 19 includes: a pair of BD sensors 34, which are arranged near the two longitudinal ends of the photosensitive drum 11; and a control unit 35, which receives detection signals from the pair of BD sensors 34, and controls the output of the element driver 18. The control unit 35 performs feedback control for the output of the element driver 18 based on the detection signals received from the pair of BD sensors 34, so that the deflection angle $\alpha$ at the light reflection surface 21, formed due to oscillation of the oscillating member 22 in the optical scanning element 17, falls within a predetermined range of the surface of the photosensitive drum 11.

Therefore, the pulse-shaped laser beam L, emitted from the laser oscillator 13 based on an image signal, passes the collimation optics 15 and enters the light reflection surface 21 of the oscillating member 22 of the optical scanning element 17, and the light that is reflected on the light reflection surface 21 is transmitted to irradiate the surface of the photosensitive drum 11 via the f$\theta$ lens 16. In this case, since the light reflection surface 21 of the oscillating member 22 of the optical scanning element 17 is oscillated, by the resonant movement of the torsion bar 23, about the longitudinal axis A of the torsion bar, the laser beam L is positioned to perform scanning in a direction that intersects the longitudinal axis A of the torsion bar. That is, the surface of the photosensitive drum 11 is scanned by the laser beam L in a direction parallel to the rotary axis of the photosensitive drum 11, and furthermore, when the photosensitive drum 11 is rotated, image data, i.e., an electrostatic latent image is formed on the surface of the photosensitive drum 11 along the rotational direction.

Materials generally employed to form the torsion bar 23 are roughly divided into those having a circular cross section and those having a rectangular cross section, and for either type of materials, the material can be processed into a predetermined cross sectional shape by die scalping. In order to improve the straightness that is crucial for the torsion bar 23, it is effective that a drawing processing with an ironing processing to a wire rod be performed, and the reduction ratio of the material is an important factor. The reduction ratio is represented by the ratio of a material feed size to a product size, measured based on the cross sectional change, and when the reduction ratio of 70 to 80% is provided, desired straightness that meets with the objective of the present invention can be obtained.

A preferable material for forming the torsion bar 23 is, for example, a work-hardened and age-hardened cobalt (Co)-nickel (Ni) base alloy for which work hardening and age hardening treatments have been given. The Co—Ni base alloy here is an alloy that contains Co and Ni. Preferably, the alloy contains, for example, chromium (Cr) to reduce stacking-fault energy, and molybdenum (Mo) and iron (Fe) as solute elements that contribute into solid solution hardening and improving of the ageing or hardening property owing to dislocation rocking due to segregation. More specifically, a Co—Ni—Cr—Mo alloy, a Co—Ni—Fe—Cr alloy, etc., can be used as example materials. Further, these alloys can further contain, for example, niobium (Nb), manganese (Mn), tungsten (W), titanium (Ti), boron (B), magnesium (Mg) and carbon (C). Nb provides the same functions as Mo and iron that are above described solute elements, Mn has a function for stabilizing the face-centered cubic lattice phase to reduce the stacking-fault energy, and W contributes into the solid solution hardening and the reduction of the stacking-fault energy. Furthermore, Ti contributes into refining of an ingot grain structure and improving of hardening, B and Mg improves hot workability, and C exhibits a function that forms a carbide together with Cr, Mo, Nb, etc., by being dissolved in a metal matrix, and performs grain-boundary strengthening. In a case wherein the previously described Co—Ni—Cr—Mo alloy is used, it is preferable that the weight ratio of the main components be Co: 20.0 to 50.0%, Ni: 20.0 to 45.0% and Cr/Mo: 20.0 to 40.0% (Cr: 18 to 26%, Mo: 3 to 11%). It is more preferable that the weight ratio especially be Co: 31.0 to 37.3%, Ni: 31.4 to 33.4%, Cr: 19.5 to 20.5% and Mo: 9.5 to 10.5%.

More specifically, strain hardening due to cold rolling is performed for a starting material that is formed by providing a substitutional solute element for a metal matrix that contains at least Co and Ni and that has been obtained by smelting, and thereafter, hot forging, homogenizing anneal, etc., and as a result, a Co—Ni—Cr—Mo alloy material is obtained. Generally for this alloy material, the aggregate texture <100> is formed in the rolling direction, while the aggregate texture <110> is formed in the direction perpendicular to the rolling direction. Therefore, in a case wherein this material is employed for the torsion bar 23 in this embodiment, the material is cut off by stamping, laser cutting or wire cutting, so that the direction perpendicular to the rolling direction corresponds to the longitudinal direction of the torsion bar 23. The torsion bar 23 having desired straightness can also be obtained in a manner that a deformation processing is performed to form the material into the shape of a product, the residual internal strain is applied by the hardening process in association with this process, and thereafter, the age hardening treatment is given in vacuum or in the reducing atmosphere. It is most appropriate that the age hardening treatment be given at a temperature of 400° C. to 700° C. for a period of about several tens of minutes to several hours (e.g., at 550° C. for two hours); however, an implementation of the heating process in the ferromagnetic field, for example, is also effective in order to reduce the processing period.

As a result, a very strong and accurate torsion bar 23 that has a low damping capacity and a satisfactory vibration property with a high elastic limit can be obtained. An example for such a non-magnetic, work-hardened and age-hardened Co—Ni—Cr—Mo alloy can be SPRON 510 (a product name; SPRON is a registered trademark) by Seiko Instruments Inc. SPRON 510 has a composition of Co: 35%, Ni: 32%, Cr: 20% and Mo: 10%.

By performing the above described processes, the torsion bar 23 is obtained that exhibits a characteristic such that the resonant frequency is acute and the vibration frequency is symmetrical to the resonant frequency, i.e., that shows a great Q value (e.g., 1000 or greater) and very little nonlinearity in the spring property. This torsion bar 23 does not become unstable even when the maximum deflection due to vibrations reaches about $3 \times 10^{-3}$ mm, and thus, the optical scanning element 17 that has only small power consumption can be provided. Therefore, the LBP 10 in this embodiment can be made compact while ensuring desired fatigue property and vibration property, stable scanning by the laser beam L can be performed with instability of a jitter, etc., being reduced, and accurate control for the scan angle can be exercised.

It should be noted that, in this embodiment, the Co—Ni base alloy having a non-magnetic property is used to form the torsion bar 23; this is because, in a case wherein the magnet 31 and the alternating magnetic field are employed as means for oscillating both the oscillating member 22 and the torsion bar 23, stable driving can be performed. Therefore, in a case wherein means other than the alternating magnetic field, such as a piezoelectric element, is used as the element driver 18, a general spring material other than non-magnetic metals can be used as a material for the torsion bar 23. More specifically, stainless steels, such as SUS 301, 302, 304, 316, 631 and 632, spring steel (SUP), piano wire (SWP) or oil-tempered carbon-steel spring wire (SWO) can be employed. Furthermore, oil-tempered chrome silicon spring wire (SWOSC), beryllium copper alloys for springs (C1700 and C1720), a copper-titanium alloy for springs (C1990), phosphor bronze for springs (C5210) and nickel silver for springs (C7701), for example, can also be used.

Furthermore, it is preferable that the magnet 31 attached to the torsion bar 23, together with the oscillating member 22, be as small as, and as light as possible, and have a high coercive force, and a Nd—Fe—B base or Sm—Co base rare-earth magnet, for example, is favorable. However, an alnico magnet, a Fe—Co—V alloy magnet, a Cu—Ni—Fe alloy magnet, a Cu—Ni—Co alloy magnet, a Fe—Cr—Co magnet, a Pt—Co magnet or a sintered magnet, such as hard ferrite (Ba ferrite or Sr ferrite), can also be used. Moreover, a bonded magnet or a thin film magnet provided by sputtering may also be employed, and the material and the manufacturing method are not especially limited based on the shape.

Non-magnetic materials, such as alumina, zirconium dioxide, beryllium, silicon nitride, aluminum nitride, sapphire, silicon carbide, silicon dioxide, glass and a resin, can be employed as materials for the two plates 29 and 30 that form the oscillating member 22. Further, when mirror-finish for the surfaces is performed, these surfaces can also be used as the light reflection surfaces 21.

Next, the following evaluation was performed for the vibration property in a case wherein the above described SPRON 510 wire having a diameter of 240 μm was employed as the torsion bar 23, and 1 mm×3 mm rectangular segments of Si wafer having a thickness of 300 μm, obtained by using a dicer, were used as the plates 29 and 30. The surface flatness for these plates 29 and 30 is 20 to 30 nm, which were evaluation results based on the PV value (maximum measured value−minimum measured value) that was obtained by employing a surface roughness tester by Zygo Corporation.

For the thus obtained plates 29 and 30, the torsion bar receiving groves 29b and 30b and the magnet receiving grooves 29c and 30c are provided on the joining surfaces 29a and 30a. Since the diameter of the torsion bar 23 is 240 μm, both the width and the depth for the torsion bar receiving grooves 29b and 30b are 120 μm; however, the cross sections of the grooves 29b and 30b need not be semicircular shapes, and rectangular cross sections may also be employed for the grooves. When such grooves are provided on the joining surfaces 29a and 30a of the plates 29 and 30, the surfaces of the plates 29 and 30, i.e., the surfaces opposite the joining surfaces 29a and 30a, would be deformed in a recessed shape, and the flatness would be reduced by about 50 nm, so that the PV value will be changed to 70 to 80 nm. However, when the torsion bar 23 is fitted in the torsion receiving grooves 29b and 30b, and in this state, the joining surfaces 29a and 30a of the two plates 29 and 30 are aligned with each other and bonded by an adhesive, deformation due to the formation of the grooves can be corrected. As a result, the flatness of the light reflection surface 21 can be improved to obtain 50 to 60 nm. In this state, the two plates 29 and 30 have a symmetrical shape that the longitudinal axis A of the torsion bar 23 serves as the axis of symmetry, and the center of gravity G is located on the longitudinal axis A of the torsion bar 23. As a result, the oscillating member 22 can be stably oscillated about the longitudinal axis A of the torsion bar 23.

For comparison, Si wafers having thicknesses of 200 μm and 525 μm were cut into rectangular segments of 1 mm×3 mm by a dicer, and two plates having different thicknesses were prepared. The flatness for the two plates is 20 to 30 nm.

Sequentially, rectangular torsion receiving grooves having both a width and a depth of 240 μm were formed in the joining surface of only the plate having a thickness of 525 μm. It was confirmed that, because of this process, the surface of the plate having a thickness 525 μm, opposite the joining surface, was deformed in a recessed shape, and the flatness thereof was reduced to 70 to 80 nm. Thereafter, in the state wherein the torsion bar 23 was fitted into the torsion bar receiving groove, the joining surfaces of the two plates were aligned and bonded together, and the flatness of the light reflection surface of the thus obtained oscillating member was measured. As a result, it was found that the PV value was reduced to 70 to 80 nm. The flatness of the surface of the plate having a thickness of 525 μm was not substantially improved even by adhering the plate having a thickness of 200 μm, and the PV value was substantially unchanged as 70 to 80 nm that was a value before the plates were bonded together. This is probably because the absolute stiffness for the plate having a thickness of 525 μm is higher than that for the plate having a thickness of 200 μm.

The scanning trajectory of the laser beam L that is formed on the surface of the photosensitive drum 11 originally should be shown like a single linear line parallel to the rotary axis of the photosensitive drum 11. However, due to the distortion of the torsion bar 23 or the deviation of the center of gravity G of the oscillating member 22 with respect to the longitudinal axis A, a high-order complicated vibration mode occurs, and therefore, an abnormal scanning trajectory, shaped like a wave motion, the figure-of-eight or a circle, might be drawn. Therefore, first, the length of the torsion bar 23 was adjusted so that the resonant frequency of the oscillating member 22 is 2 kHz. Furthermore, the value of an alternating current to be supplied was adjusted, so that the deflection angle α is ±10 degrees, ±17 degrees, ±25 degrees, ±32 degrees, ±38 degrees, ±45 degrees or ±50 degrees. When the scanning trajectory of the laser beam L formed on the surface of the photosensitive drum 11 in this case were examined, it was confirmed that the abnormal vibrations did not occur at all of the deflection angles α, and a stable scanning trajectory could be drawn.

Figure 6:
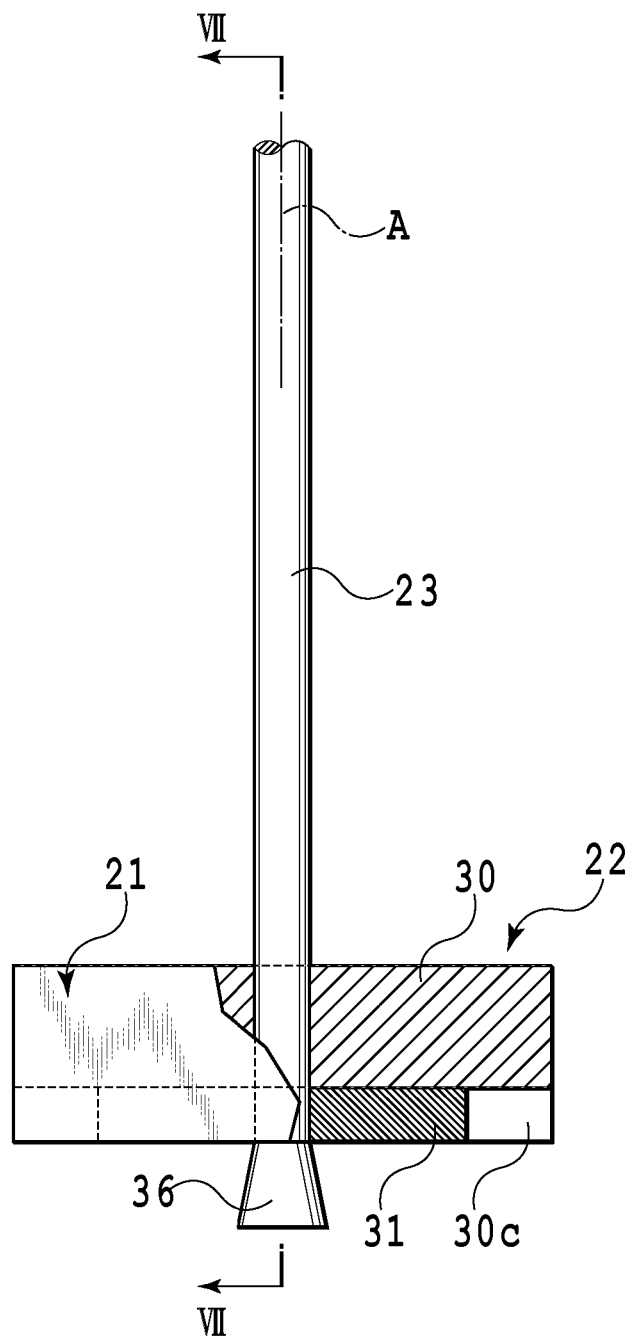
FIG. 6 is an elevational front view illustrating, in partially cutaway, the structure of the main portion in one embodiment of the oscillation element according to the present invention.
Figure 7:
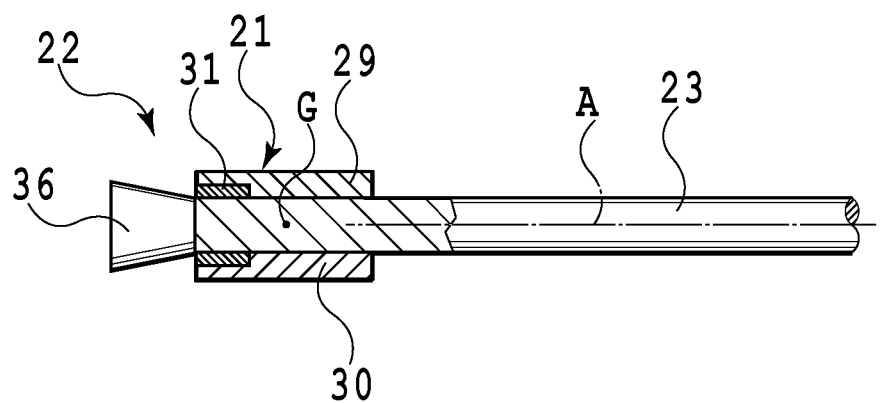
FIG. 7 shows a sectional view taken along arrows VII-VII in FIG. 6.
Figure 8:
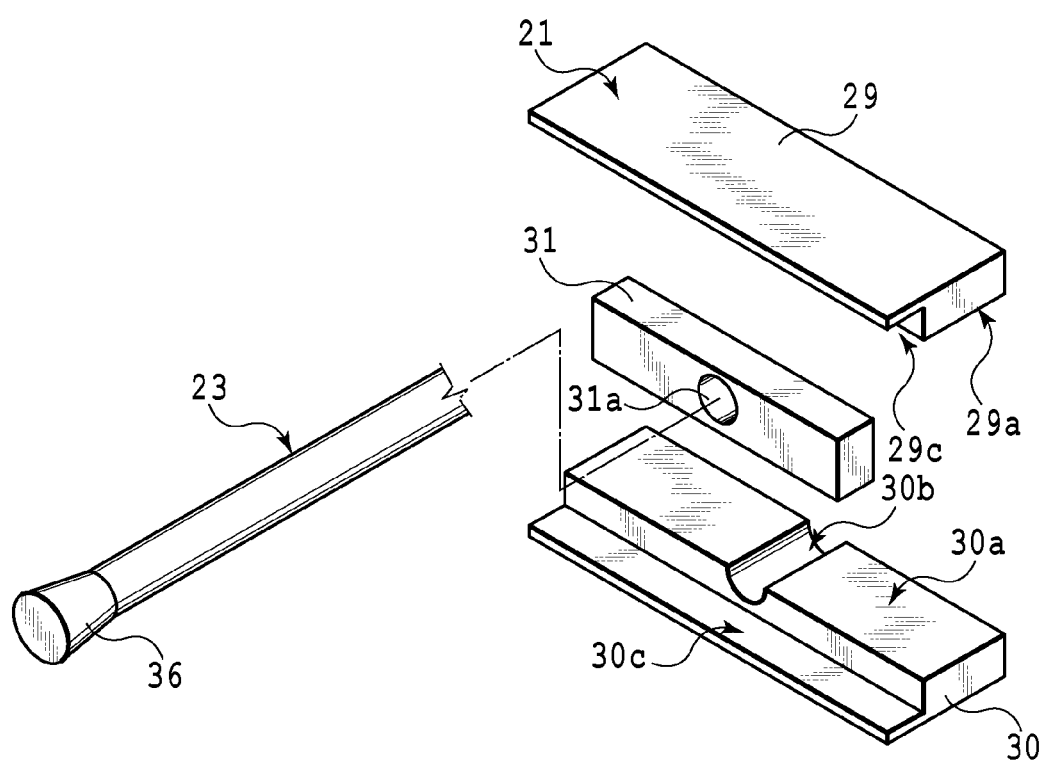
FIG. 8 shows an exploded view of the embodiment in FIG. 6.
Figure 9:
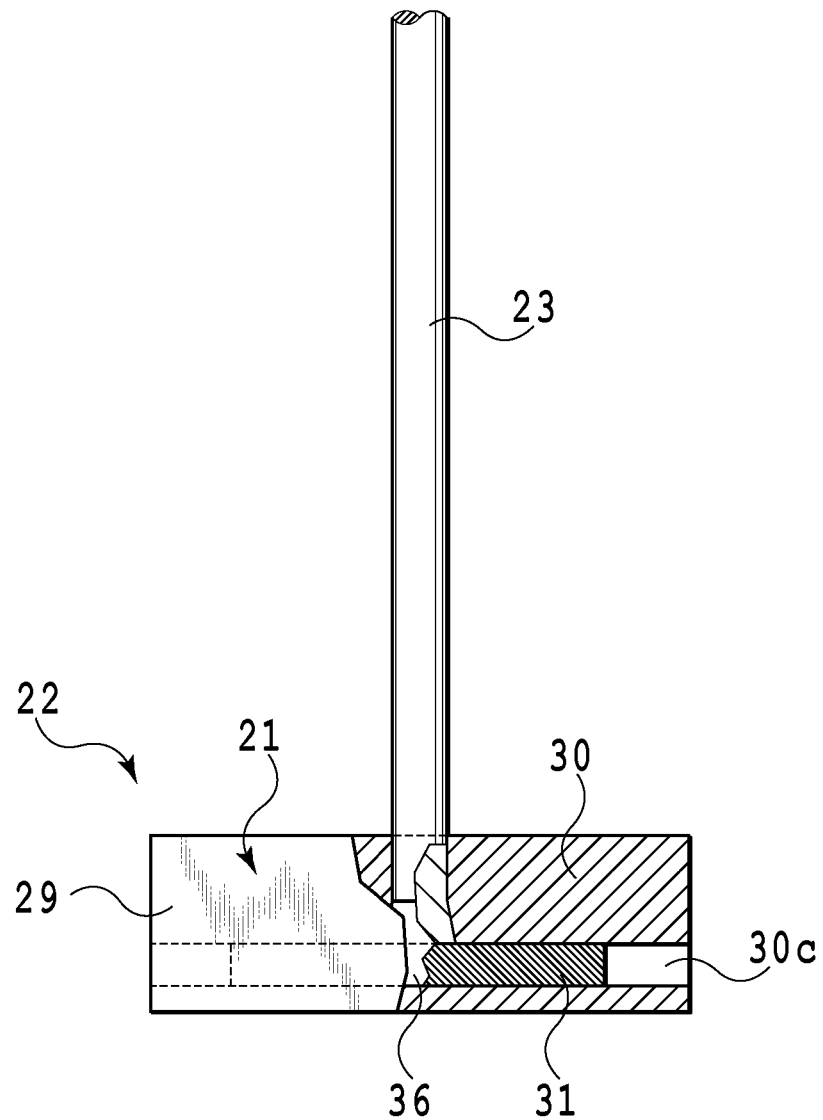
FIG. 9 is an elevational front view illustrating in partially cut-away, the structure of the main portion in another embodiment of the oscillation element according to the present invention.
Figure 10:
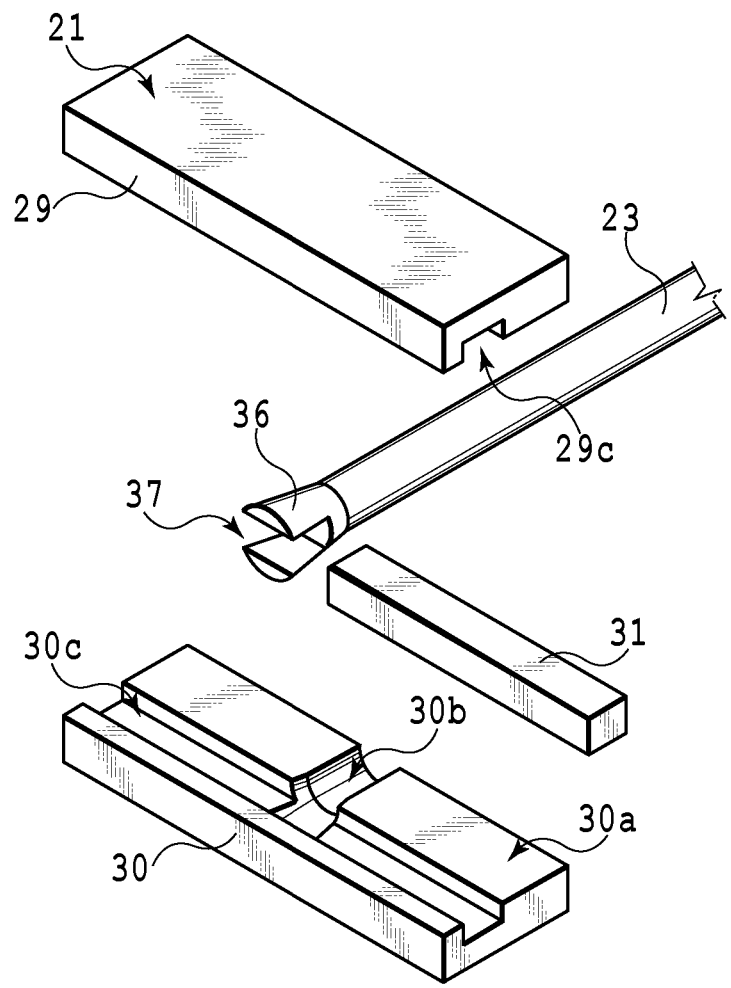
FIG. 10 shows an exploded view of the embodiment in FIG. 9.

The structure for the main portion of the optical scanning element 17 in FIGS. 2 to 5, which is employed as the oscillation element in the present invention, can also be changed to the structure shown in FIGS. 6 to 10, as needed. That is, the elevational front view of the main portion in another embodiment of the optical scanning element 17 in this invention is shown as a partially cutaway view in FIG. 6; the sectional view taken along arrows VII-VII in FIG. 6 is shown in FIG. 7; and the exploded view of the external appearance is shown in FIG. 8. Further, the elevational front view of the main portion in a further embodiment of the optical scanning element 17, which is used as the oscillation element in this invention, is shown as a partially cutaway view in FIG. 9, and the exploded view of the external appearance is shown in FIG. 10.

With the embodiment shown in FIGS. 6 to 8, a stopper portion 36 having a frusto-conical shape is formed at the distal end of the torsion bar 23 in order to prevent the torsion bar from slipping out and also to maintain the torsion bar in position. A magnet 31 having the shape of a rectangular bar is integrally formed together with an oscillating member 22 so as to face the stopper portion 36, and one end surface that faces the stopper portion 36 is externally exposed from the oscillating member 22. The magnet 31 in this embodiment has a two-piece structure to sandwich the torsion bar 23; however, a single-piece magnet 31 where a hole 31a, through which the torsion bar 23 passes, is formed in advance may also be used.

With the embodiment shown in FIGS. 9 and 10, the stopper portion 36 in the above described embodiment is embedded in an oscillating element 22, and the location of the oscillating element 22 can be more accurately determined, with respect to the torsion bar 23. In this embodiment, a notch portion 37 is configured in the stopper portion 36 to communicate with magnet receiving grooves 29c and 30c that are provided on two plates 29 and 30, so that a magnet 31 can be extended across the stopper portion 36 of the torsion bar 23. Therefore, the magnet 31, the distal end of the torsion bar 23 and the oscillating member 22 can be joined together more securely.

Incidentally, it is common that slight vertical or horizontal distortion essentially occurs for the above described elongated torsion bar 23 due to a change in quality. Such vertical or horizontal distortion of the torsion bar 23 brings with abnormal vibrations of the oscillating member 22, and causes the reduction of the deflection angle α at the light reflection surface 21, with respect to supplied energy. That is, when the center of gravity G of the oscillating member 22, which is fixed to the distorted torsion bar 23, is not aligned with the previously described ideal oscillation axis $A_R$, abnormal vibrations occur in the oscillating member 22. Therefore, in order to oscillate the light reflection surface 21 of the oscillating member 22 at desired deflection angle α, a larger amount of current must be supplied to the sheet coil 26.

Figure 11:
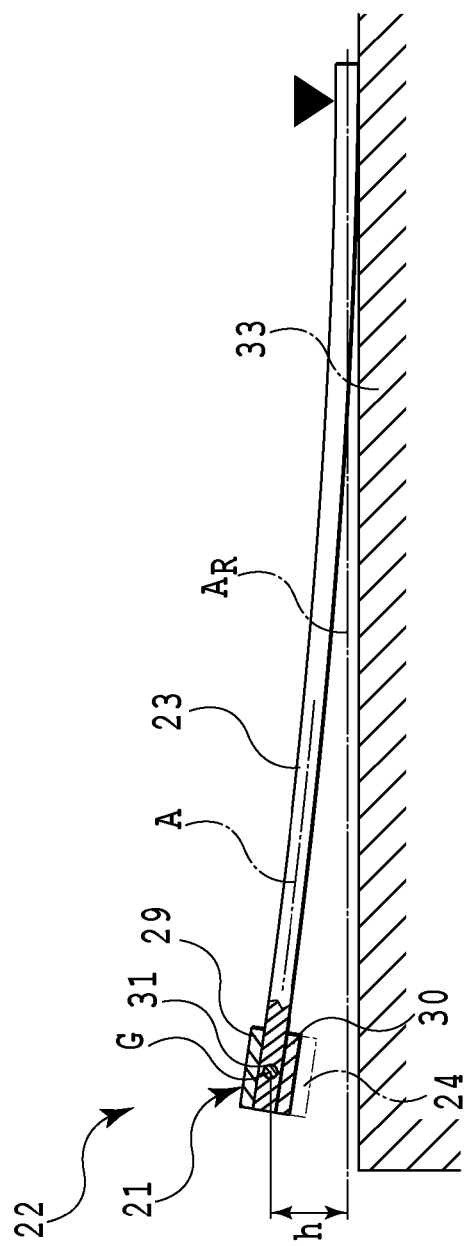
FIG. 11 is a schematic diagram showing a relationship between the ideal oscillation axis of a distorted torsion bar and the center of gravity of the oscillating member.

The distortion of the torsion bar 23 is intensively shown in FIG. 11. The proximal end of the torsion bar 23 is pressed against the surface of a glass surface plate 33, and while this portion is employed as the center, the torsion bar 23 is rolled on the glass surface plate 33 to find a location at which a maximum height h is obtained from the surface of the glass surface plate 33 to the center of gravity G of the oscillating member 22. It should be noted that, instead of the height h, a height from the surface of the glass surface plate 33 to the distal end of the torsion bar 23 may also be obtained. In this state, the oscillating member 22 is mounted to the torsion bar 23, so that the surface of either plate, i.e., the plate 29, which serves as the light reflection surface 21, is arranged straight upward, and the surface of the other plate, i.e., the plate 30, is opposite the surface of the glass surface plate 33. Further, in this state, the direction of the hole 32 provided in the torsion bar 23 is also determined, so that the poles of the magnet 31 are located in parallel to the surface of the glass surface plate 33, and perpendicular to the longitudinal axis A of the torsion bar 23.

According to the present invention, a gravity center compensation member 24 is attached to the oscillating member 22 and/or the torsion bar 23 to align the center of gravity of the vibration system with the ideal oscillation axis $A_R$ of the torsion bar 23. More specifically, in this embodiment, the gravity center compensation member 24 is bonded to the surface of the other plate 30 that faces the substrate 27 side, so that the center of gravity of the gravity center compensation member 24 is located on the imaginary plane described above, and on the side closer to the ideal oscillation axis $A_R$ than the center of gravity G of the oscillating member 22. That is, the gravity center compensation member 24 is mounted on the face of the torsion bar 23 that is deflected upward, i.e., the surface of the other plate 30. It is preferable that the gravity center compensation member 24 have mass, with which the barycenter of the vibration system that includes the oscillating member 22, the magnet 31 and the gravity center compensation member 24 eventually matches the ideal oscillation axis $A_R$. Therefore, the light reflection surface 21 of the oscillating member 22 is efficiently oscillated around the ideal oscillating axis $A_R$, with respect to supplied energy. It should be noted that the gravity center compensation member 24 may also be arranged between either plate 29 or 30, which is located near the ideal oscillation axis $A_R$, or the torsion bar 23.

An element driver 18 in this embodiment includes: the magnet 31 that is fixed to the oscillating member 22 and/or the torsion bar 23; the sheet coil 26 that is provided on the base 20 side so as to be located opposite the magnet 31 with a gap in between; and a power source (not shown). An alternating current is supplied to the sheet coil 26 by the power source of the element driver 18 corresponding to the resonant frequency of the vibration system that includes the torsion bar 23, the oscillating member 22, the magnet 31 and the gravity center compensation member 24. As a result, the light reflection surface 21 of the oscillating member 22 can oscillate around the ideal oscillation axis $A_R$ at the resonant frequency of the vibration system, i.e., can swing under the resonant state. Therefore, the amplitude of the vibration system, i.e., the deflection angle α at the light reflection surface 21 of the oscillating member 22, can be adjusted based on the amount of a current supplied to the sheet coil 26. The waveform of the alternating current may be not only the sine wave, but also the triangular wave, or the pulse output. Further, instead of the above described sheet coil 26, a coil that includes a soft magnetic material used as a yoke may be employed. Moreover, a pair of magnetic field application means may also be arranged to sandwich the oscillating member 22, so long as these means will not interfere with the light reflection surface 21 of the oscillating member 22.

Figure 12:
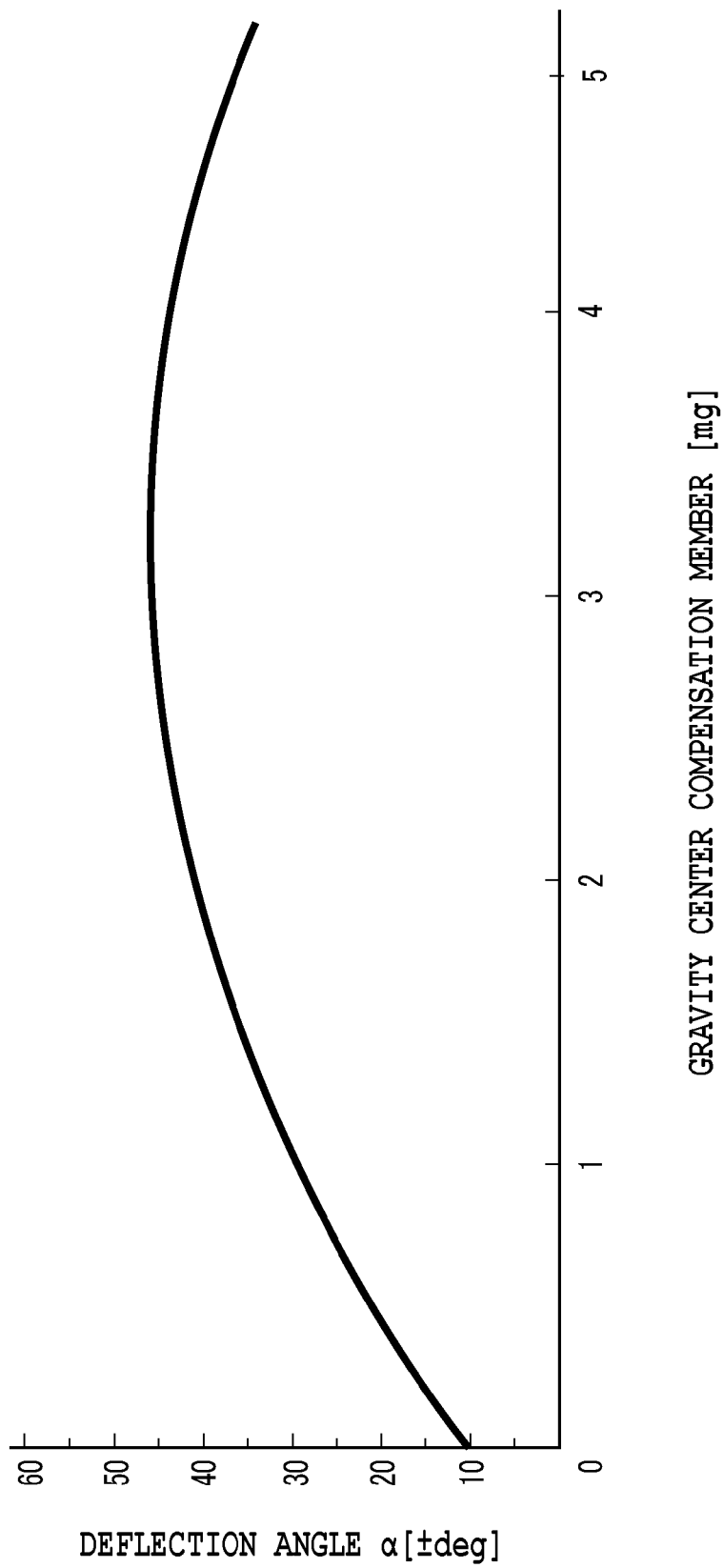
FIG. 12 is a graph showing schematically a relationship between the mass of a gravity center compensation member and the deflection angle of the oscillating member.

A relationship between the mass of the gravity center compensation member 24 and the deflection angle α at the light reflection surface 21 of the oscillating member 22 is shown in FIG. 12. This represents a change of the deflection angle α at the light reflection surface 21 of the oscillating member 22 in a case wherein a predetermined amount of alternating current is supplied to the sheet coil 26, with respect to the torsion bar 23, which has a length of 32 mm and a rectangular cross section of 0.35×0.15 mm, and for which a distortion distance of 50 μm has occurred in FIG. 6. The two plates 29 and 30 used here have a thickness of 0.1 mm and a rectangular surface of 2.8×1.4 mm, and the magnet 31 having a length of 3 mm is incorporated, while the gravity center compensation member 24 having a different weight is bonded to the surface of the plate 30. As apparent from FIG. 12, it can be confirmed that the deflection angle α becomes maximum in the case wherein the gravity center compensation member 24 having a weight of about 3 mg is bonded. Therefore, even when the location of the center of gravity G of the oscillating member 22 is unknown, so long as the direction of distortion of the torsion bar 23 is identified, the optimal gravity center compensation member 24 can be selected, for which the maximum deflection angle α of the oscillating member 22 is obtained. That is, the gravity center compensation member 24 having different mass need only be mounted to the face of the torsion bar 23 where upward distortion has occurred, and the deflection angle α of the oscillating member 22 can be measured. It should be noted that the shape of the cross section of the torsion bar 23 orthogonal to the longitudinal axis A is not limited to a circular shape, but an arbitrary cross-sectional shape, such as a rectangular shape in cross section as described in FIG. 12, may be used.

A controller 19 includes: a pair of BD sensors 34, which are arranged near the two longitudinal ends of a photosensitive drum 11; and a control unit 35, which receives detection signals from the pair of BD sensors 34, and controls the output of the element driver 18. The control unit 35 performs feedback control for the output of the element driver 18 based on the detection signals received from the pair of BD sensors 34, so that the deflection angle α of the light reflection surface 21, formed due to oscillation of the oscillating member 22 in an optical scanning element 17, falls within a predetermined range of the surface of the photosensitive drum 11.

Therefore, a pulse-shaped laser beam L, emitted from a laser source 13 based on an image signal, passes an collimation optics 15 and enters the light reflection surface 21 of the oscillating member 22 of the optical scanning element 17, and the light that is reflected on the light reflection surface 21 is transmitted to irradiate the surface of the photosensitive drum 11 via a fθ lens 16. In this case, since the light reflection surface 21 of the oscillating member 22 of the optical scanning element 17 is oscillated, by the resonant movement of the torsion bar 23, about the ideal oscillation axis $A_R$, the laser beam L is emitted in a direction in parallel to the rotational axis of the photosensitive drum 11. Furthermore, when the photosensitive drum 11 is rotated, image data, i.e., an electrostatic latent image is formed on the surface of the photosensitive drum 11 along the rotational direction.

Figure 13:
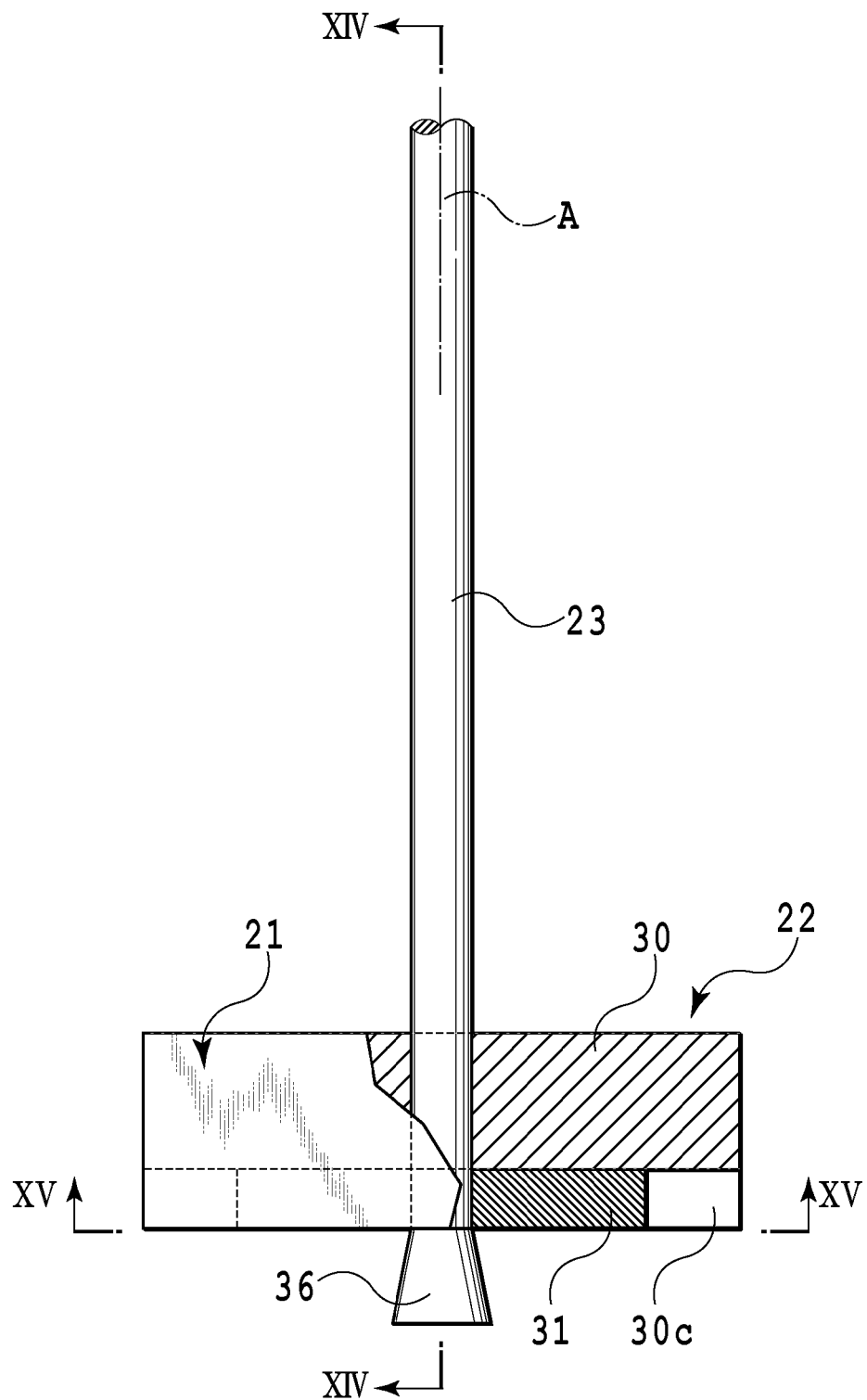
FIG. 13 is an elevational front view illustrating in partially cutaway, the structure of a main portion in one embodiment of the oscillation element according to the present invention.
Figure 14:
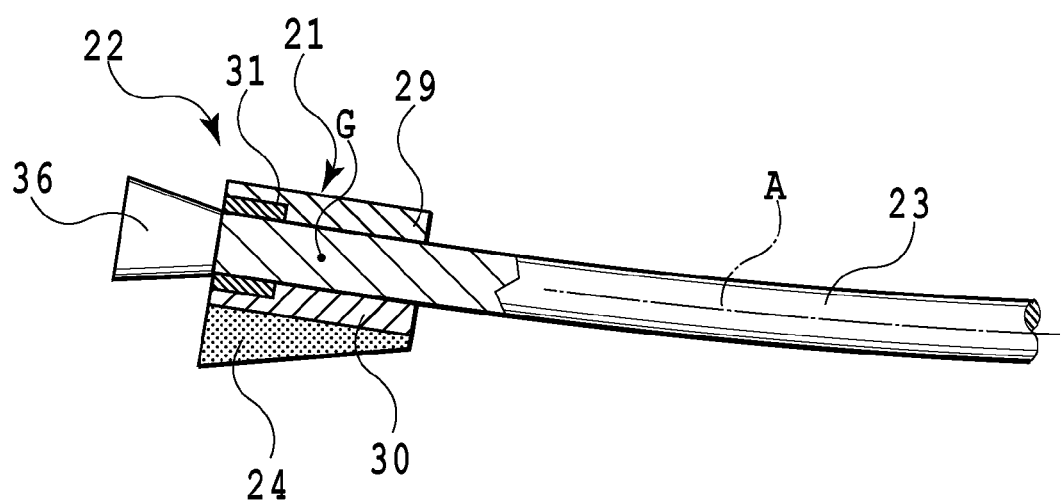
FIG. 14 shows a sectional view taken along arrows XIV-XIV in FIG. 13.
Figure 15:
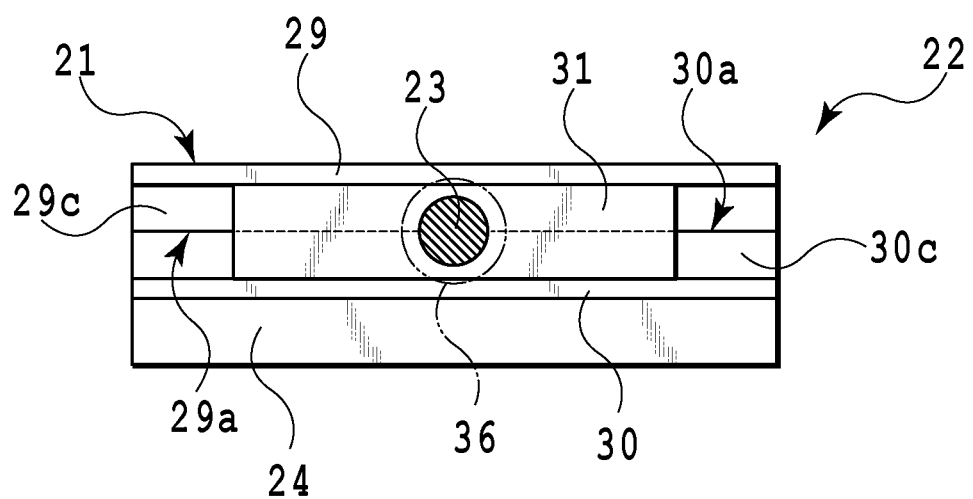
FIG. 15 shows a sectional view taken along arrows XV-XV in FIG. 13.
Figure 16:
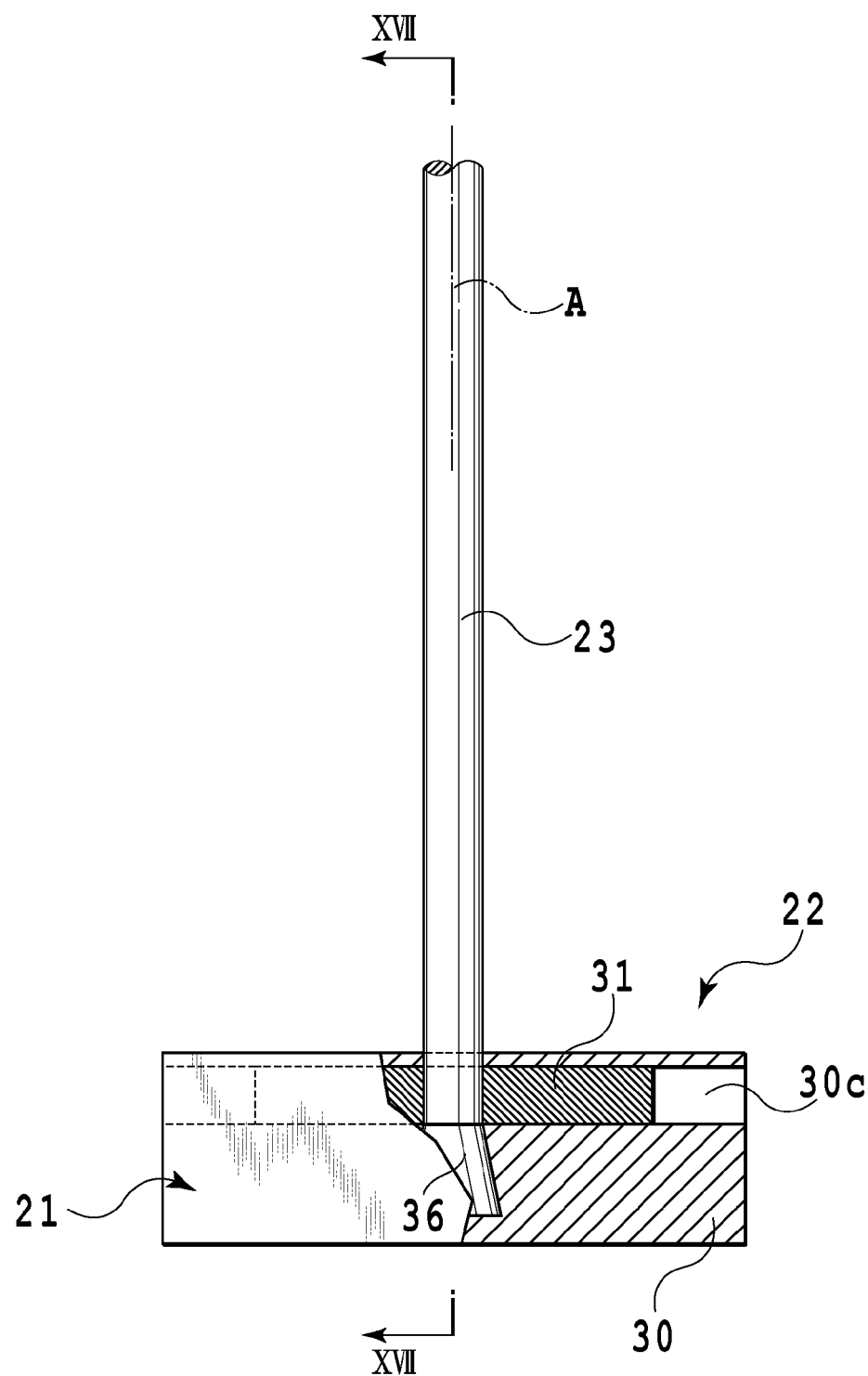
FIG. 16 is an elevational front view illustrating in partially cut-away, the structure of a main portion in another embodiment of the oscillation element according to the present invention.
Figure 17:
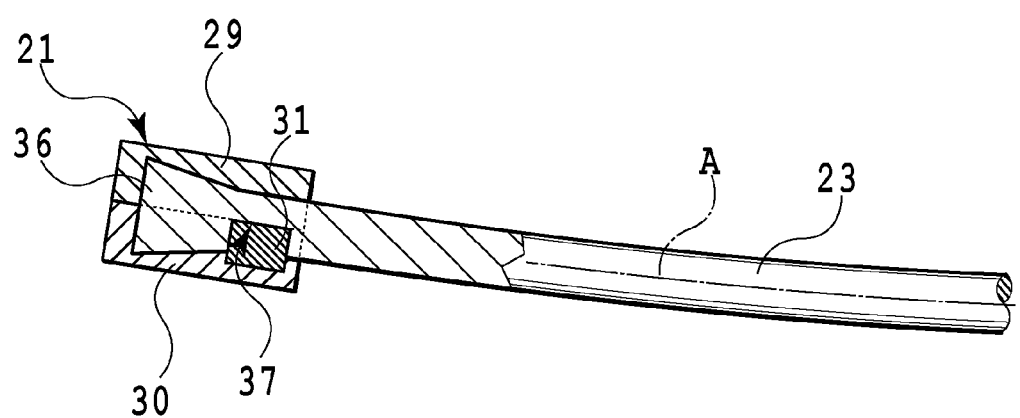
FIG. 17 shows a sectional view taken along arrows XVII-XVII in FIG. 16.

The structure for the main portion of the optical scanning element 17 in FIGS. 2 to 5 can also be changed to the structure shown in FIGS. 13 to 17, as needed. That is, the elevational front view of the main portion in a further embodiment of the optical scanning element 17 in this invention is shown as a partially cutaway view in FIG. 13; the sectional view taken along arrows XIV-XIV in FIG. 13 is shown in FIG. 14; and the enlarged sectional view taken along arrows XV-XV in FIG. 14 is shown in FIG. 15. Further, the elevational front view of the main portion in one more embodiment of the optical scanning element 17, which is used as the oscillation element in this invention, is shown as a partially cutaway view in FIG. 16, and the sectional view taken along arrows XVII-XVII in FIG. 16 is shown in FIG. 17.

With the embodiment shown in FIGS. 13 to 15, a stopper portion 36 having a frusto-conical shape is formed at the distal end of the torsion bar 23 in order to prevent slipping out of the torsion bar and also to maintain the torsion bar in position. A magnet 31 is integrally provided together with an oscillating member 22 so as to face the stopper portion 36, and one end surface that faces the stopper portion 36 is externally exposed from the oscillating member 22. The magnet 31 in this embodiment has a two-piece structure to sandwich the torsion bar 23; however, a single-piece magnet 31 where a hole 32, through which the torsion bar 23 passes, is formed in advance may also be employed. A gravity center compensation member 24 is formed in a wedge shape that the thickness is gradually reduced toward the base end of the torsion bar 23 along the longitudinal axis A.

With the embodiment shown in FIGS. 16 and 17, the stopper portion 36 in the above described embodiment is embedded in an oscillating element 22, and the location of the oscillating element 22 can be more accurately determined, with respect to the torsion bar 23. In this embodiment, a magnet 31 also serves as a gravy center compensation member 24. That is, the magnet 31 is inserted into a notch portion 37, which is provided on the face of the torsion bar 23 that is deflected upward, and in this state, two plates 29 and 30 are aligned together, so that the stopper 36 and the magnet 31 are sandwiched between the plates 29 and 30. This structure is suitable especially for a case wherein the oscillating member 22 is provided by injection molding using a resin, and the magnet 31 can be integrally molded with the distal end of the torsion bar 23.

According to the oscillation element of the present invention, since the flat portion of the oscillating member is arranged perpendicular to the imaginary plane that includes the ideal oscillation axis and the center of gravity of the oscillating member, and since the center of gravity of the gravity center compensation member is located closer to the ideal oscillation axis than the center of gravity of the oscillating member, resonant vibration of the oscillating member can be efficiently performed.

In a case wherein the gravity center compensation member is mounted on the surface of the torsion bar on the side along the ideal oscillation axis, resonant vibration of the oscillating member can be more efficiently performed. This is applied also for a case wherein the oscillating member includes two plates having the same sizes and shapes, which are bonded together with the torsion bar in between, and wherein the gravity center compensation member is arranged on one of the plates located closer to the ideal oscillation axis, or between this plate and the torsion bar. Furthermore, in a case wherein the gravity center compensation member is shaped like a wedge, for which the thickness along the imaginary plane is gradually reduced toward one end of the torsion bar along the axis of the torsion bar, resonant vibration of the oscillating member can also be more efficiently attained.

According to the optical scanning device of this invention, since the light reflection surface of the oscillating member is positioned perpendicular to the imaginary plane that includes the ideal oscillation axis and the center of gravity of the oscillating member, and since the center of gravity of the gravity center compensation member is located closer to the ideal oscillation axis than the center of gravity of the oscillating member, resonant vibration of the oscillating member can be efficiently accomplished.

Since the image forming apparatus in the present invention includes the optical scanning device according to the present invention and an image forming medium that is irradiated, via the light reflection surface of the oscillating member of the oscillation element, by light emitted from a light source, the compact and high-performance image forming apparatus can be obtained.

Since the image projection apparatus in the present invention includes the optical scanning device according to the present invention, a light deflection device that deflects, in a direction parallel to the ideal oscillation axis, light that is emitted from the light source, and a screen to which the thus deflected light is applied, the compact and high-performance image projection apparatus can be obtained.

A consideration will now be given for the effect of the distortion of the torsion bar 23 on the deflection angle α at the light reflection surface 21 of the oscillating member 22 that supports the torsion bar 23.

As shown in FIG. 11, the proximal end of the torsion bar 23 is pressed against the surface of the glass surface plate 33, and while this portion is employed as the center, the torsion bar 23 is rolled on the glass surface plate 33. The distortion of the distal end of the torsion bar 23, more precisely, the distortion at the location where the maximum height h is obtained from the center of gravity of the oscillating member 22 to the glass surface plate 33, is measured as straightness. As samples, torsion bars having distortion distances of 0 μm, μm and 100 μm, respectively, were prepared, and the oscillating members 22 mounted at the distal ends were oscillated at a resonant frequency of 2 kHz.

As a method for measuring the deflection angle caused by oscillation of the oscillating member 22, the value of a current that passes through the sheet coil 26 was changed, so that the deflection angle α at the light reflection surface 21 of the oscillating member 22, i.e., the deflection angle α of the reflected laser beam L was gradually increased. The laser beam L reflected at the light reflection surface 21 should draw one linear line as a scan line for scanning the photosensitive drum 11; however, when the deflection angle is increased, the laser beam will draw an abnormal scan line, such as a curved line, a figure-of-eight line or a circular line. When such a condition occurs during a gradual increase of the deflection angle α, it is ascertained that abnormal vibrations have occurred. In such a case, the interval between the deflection angles at which the abnormal vibration occurred and the preceding deflection angle was divided into smaller segments to change the deflection angle, and the largest deflection angle at which no abnormal vibrations occurred was regarded as the maximum deflection angle.

Figure 18:
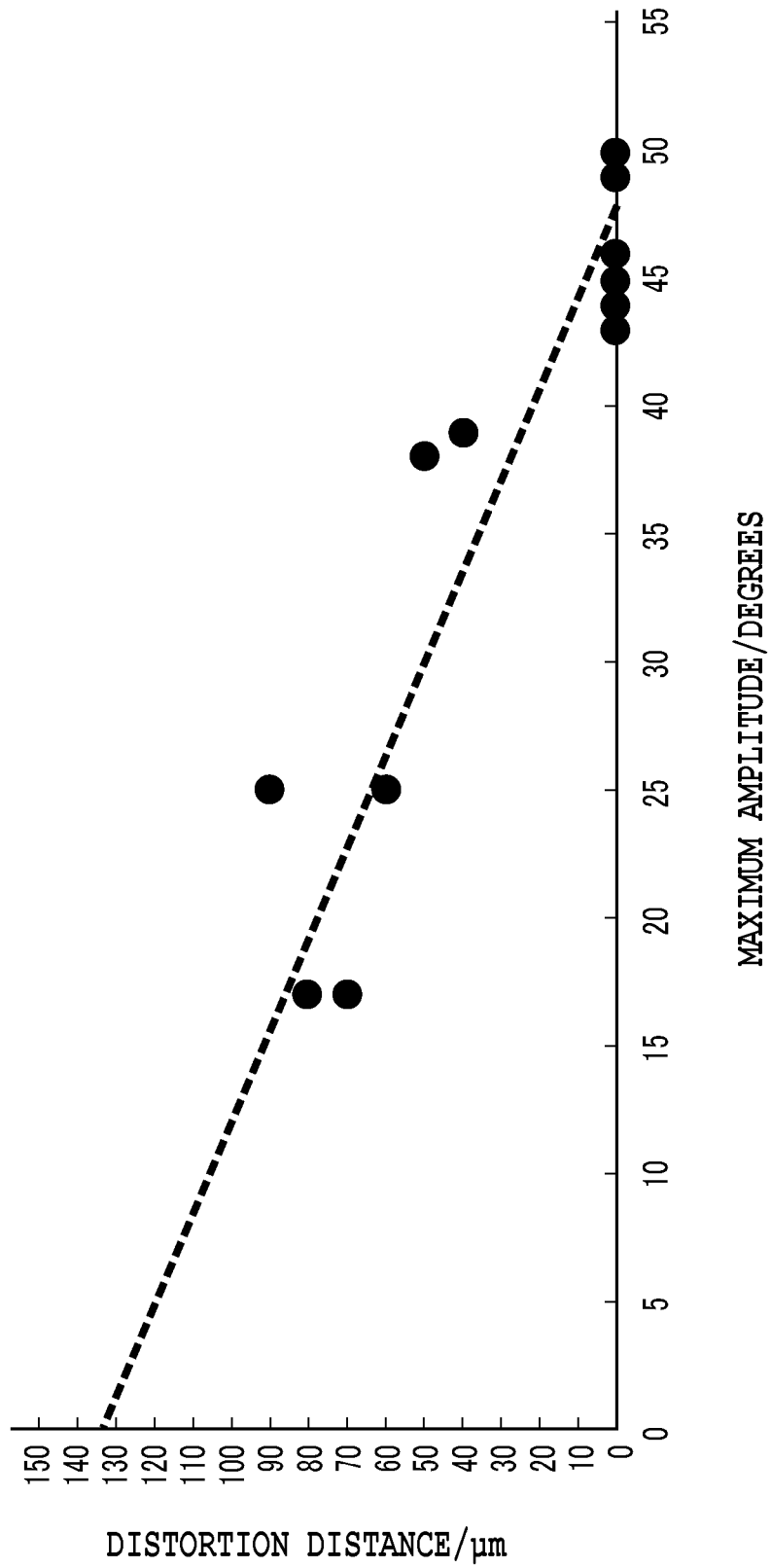
FIG. 18 is a graph showing a relationship between the maximum amplitude of an oscillating member included in an oscillation element, and a distortion distance of a torsion bar included in the oscillation element.

The results obtained by performing measurement in this manner are shown in FIG. 18. As apparent from FIG. 18, the maximum deflection angle of the torsion bar 23 having a distortion distance of 0 μm is ±45 to ±50 degrees, the maximum deflection angle of the torsion bar 23 having a distortion distance of 50 μm is ±25 to ±39 degrees, and the maximum deflection angle α of the torsion bar 23 having a distortion distance of 100 μM is ±17 to ±25 degrees. It is understood from these results that, compared with the case of 0 μm that is no distortion in the torsion bar 23, the maximum deflection angles in the case of a distortion distance of 50 μm and the case of a distortion distance of 100 μm are reduced by about 30% and 60%, respectively. That is, it is confirmed that the distortion of the torsion bar 23, i.e., the straightness, greatly affects the deflection angle of the oscillating member 22 of the optical scanning element 17.

Therefore, the present invention proposes the following method in order to improve the straightness of the torsion bar 23.

Figure 19:
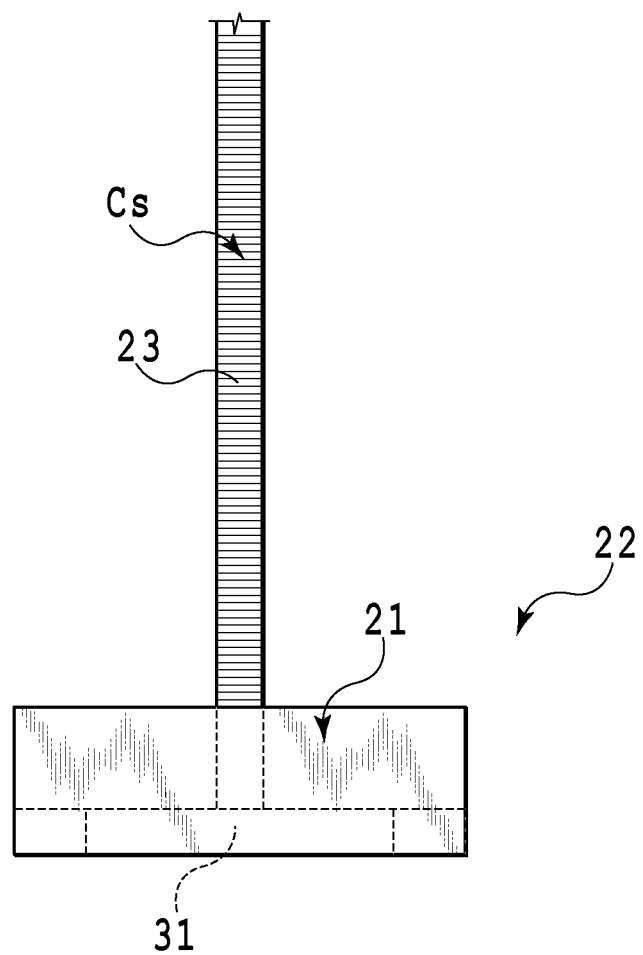
FIG. 19 shows a plan view of a main portion in a yet another embodiment of the oscillation element.

In a case wherein a plate member is employed to form the torsion bar 23, stamping, laser cutting, wire cutting, etching or superplastic forming is used to provide a definite shape for the torsion bar 23. In this case, a distortion distance of the obtained torsion bar 23 varies widely and falls in a range of 100 μm to 200 μm. Especially in a case wherein a roll shaped material is used, it is general that the initial distortion in the RD direction, which is the rolling direction, is greater than the distortion in the TD direction that is a direction perpendicular to the rolling direction. Therefore, in a case wherein the obtained product is employed as the torsion bar 23, it is effective that the TD direction be regarded as the longitudinal direction of the torsion bar 23 as the countermeasure for the distortion of the torsion bar 23. That is, when the torsion bar 23 is formed by drawing process, the outer face of the torsion bar 23 has machining marks due to the drawing process. For identifying the rolling direction, as schematically shown in FIG. 19, the machining marks on the surface of the material, i.e., the direction of die marks $C_S$ can be employed. In other words, the longitudinal direction in which the die marks $C_S$ are extended is regarded as the rolling direction.

Figure 20:
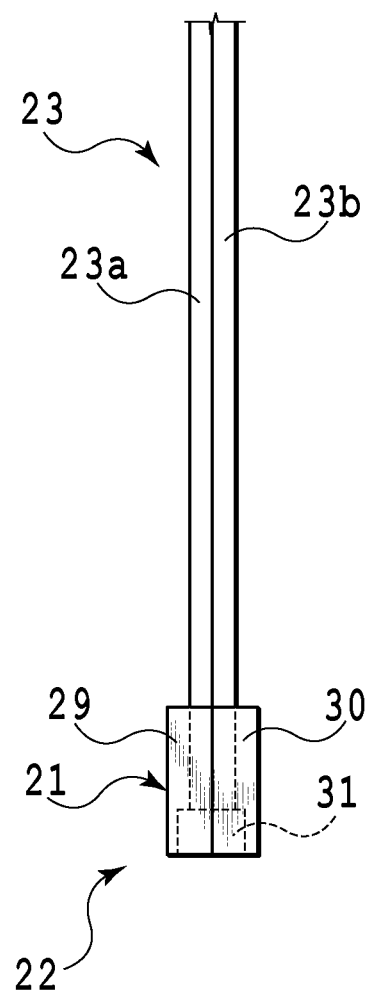
FIG. 20 shows a right side view of the embodiment shown in FIG. 19.

Furthermore, in order to improve the vibration property of the material, the heating process is given as an example age hardening treatment, and in a case wherein SUS 304 is used to form the torsion bar 23, machining for the material is performed, together with the heating process, by applying a required control tension, i.e., a so-called tension annealing process is performed, so that almost all the distortion can be removed. Furthermore, in a case wherein slight distortion of the torsion bar 23 is still present after the age hardening treatment has been given, two torsion bars having the same distortion distance, i.e., having substantially the same straightness, are prepared. As schematically shown in FIG. 20, two torsion bar pieces 23a and 23b are joined together using an adhesive by aligning the revere surfaces, so that the two bar pieces are distort in the reverse directions from each other, and in this manner, one torsion bar 23 is provided. The distortion distance of the thus obtained torsion bar 23 is equal to or smaller than 10 µm, and as shown in FIG. 18, the maximum deflection angle is ±45 degrees. Therefore, the optical scanning element 17 that can perform optical scanning at a large angle can be stably supplied.

Figure 21:
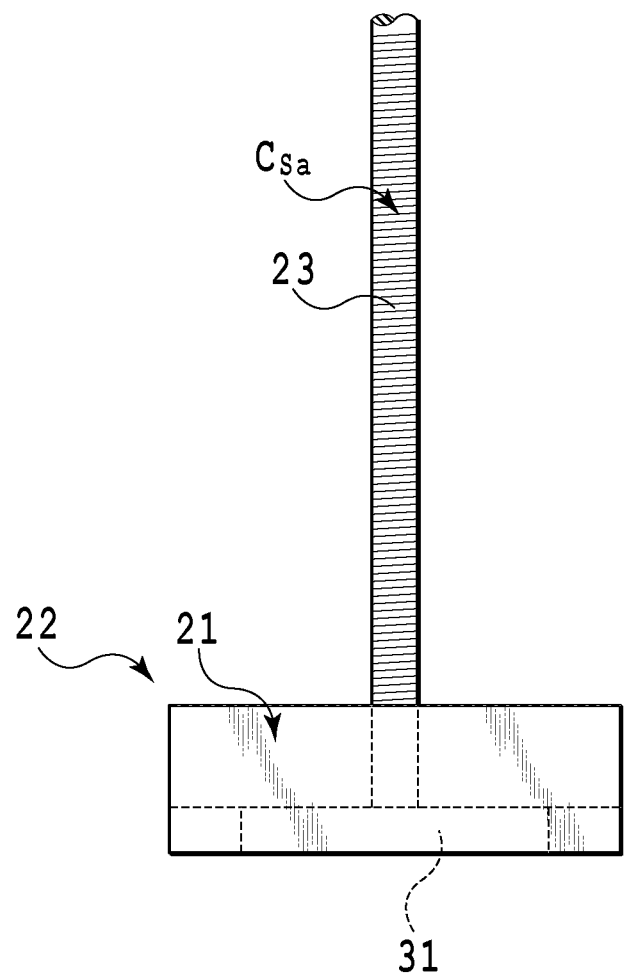
FIG. 21 shows a plan view of a main portion for a further embodiment of the oscillation element.
Figure 22:
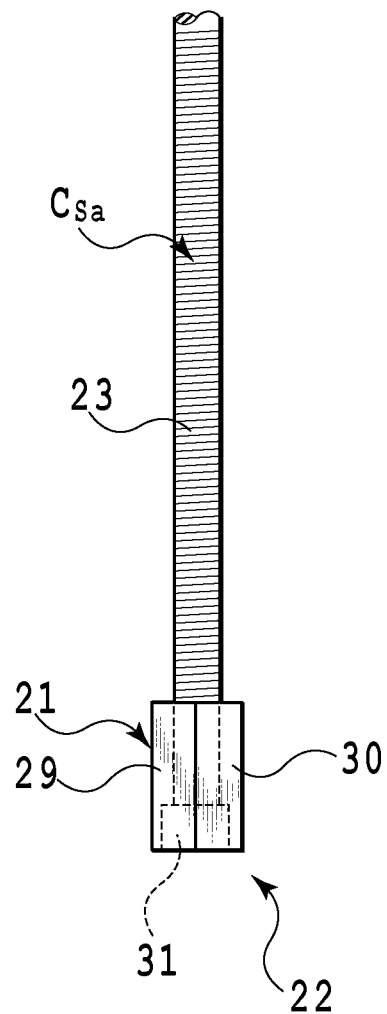
FIG. 22 is a right side view of the embodiment shown in FIG. 21.

In a case wherein a wire rod, such as a round bar or a square bar, is used to form the torsion bar 23, or wherein a raw material is processed to obtain a wire, die scalping is performed to obtain a definite shape for the torsion bar 23. In this case as well as in the case wherein a plate-like material is employed for formation, a distortion distance of the obtained torsion bar 23 is large. In order to reduce the distortion, i.e., to improve the straightness, it is effective that ironing be performed for the wire rod during the die scalping, i.e., ironing by applying a tension be performed. The longitudinal direction of the torsion bar 23 in this case can be identified by referring to the direction of spiral die marks $C_S$, on the surface of the material. That is, as schematically shown in FIGS. 21 and 22, the spiral die marks $C_{Sa}$ are formed in the longitudinal direction of the torsion bar 23. It should be noted that, for the die scalping process, the reduction ratio determined by the ratio of the cross-sectional areas of the torsion bar 23 before and after the process was performed is the most important factor, and the optimal value is 70 to 80%. The distortion distance for the thus obtained torsion bar 23 is also equal to or smaller than 10 µm, and the optical scanning element 17 that can perform optical scanning at a large angle can be stably supplied.

When the above described processing is performed for a plate-shaped material or a wire rod, the straightness can be improved so as to align the longitudinal axis A of the torsion bar 23 with the ideal oscillation axis $A_R$, and the optical scanning element 17 that can perform optical scanning at a large angle can be provided. According to this embodiment, the straightness of the torsion bar 23 has been improved in this manner, and furthermore, when the gravity center compensation member 24 is additionally provided for the oscillating member 22 as in the previous embodiment, the straightness can be more improved. Specifically, the gravity center compensation member 24 is bonded to the surface of the second plate 30 of the oscillating member 22, so that the center of gravity of the oscillating member 22 in FIG. 6 is located closer to the surface of the glass surface plate 33. With this structure, the distortion of the torsion bar 23 can be reduced, and as a result, the longitudinal axis A of the torsion bar 23 can match the ideal oscillation axis $A_R$.

Since the above described arrangement is used in the present invention, desired straightness of the torsion bar is obtained, and further, the oscillation element suitable for extending a resign range of the deflection angle, the optical scanning device, and the image forming apparatus and the image projection apparatus that this optical scanning device is incorporated can be provided.

Figure 27:
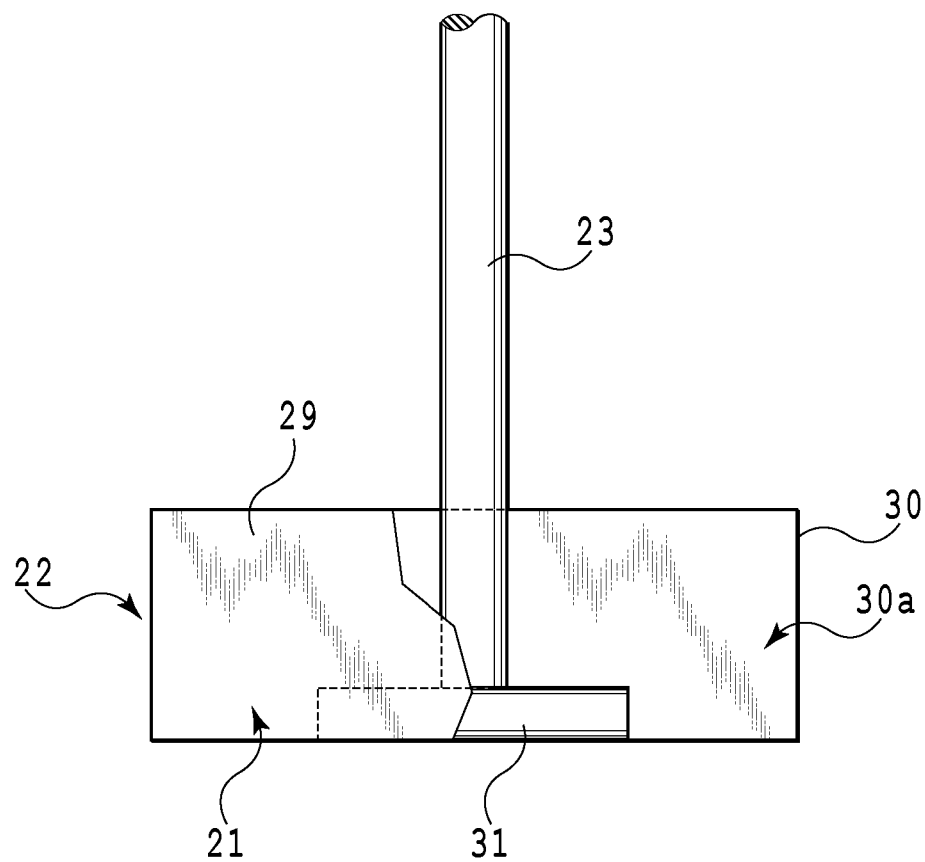
FIG. 27 is an elevational front view illustrating in partially cutaway, the structure of a main portion in a yet further embodiment of the oscillation element.
Figure 28:
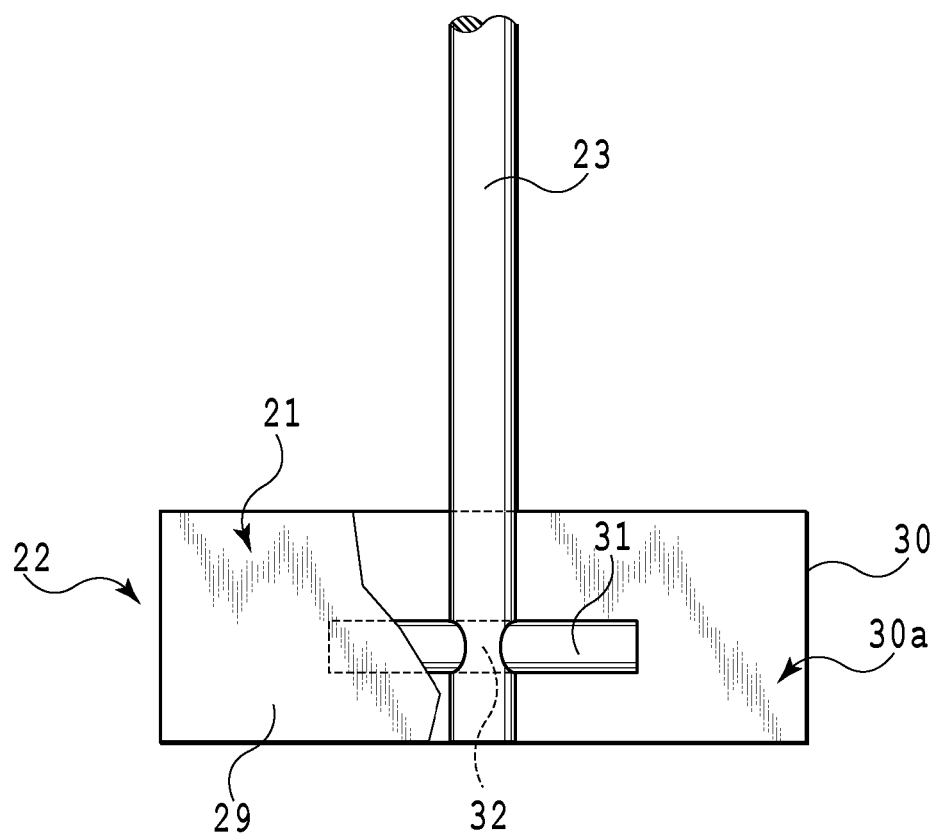
FIG. 28 is an elevational front view illustrating in partially cutaway, the structure of a main portion in one embodiment of the oscillation element.
Figure 29:
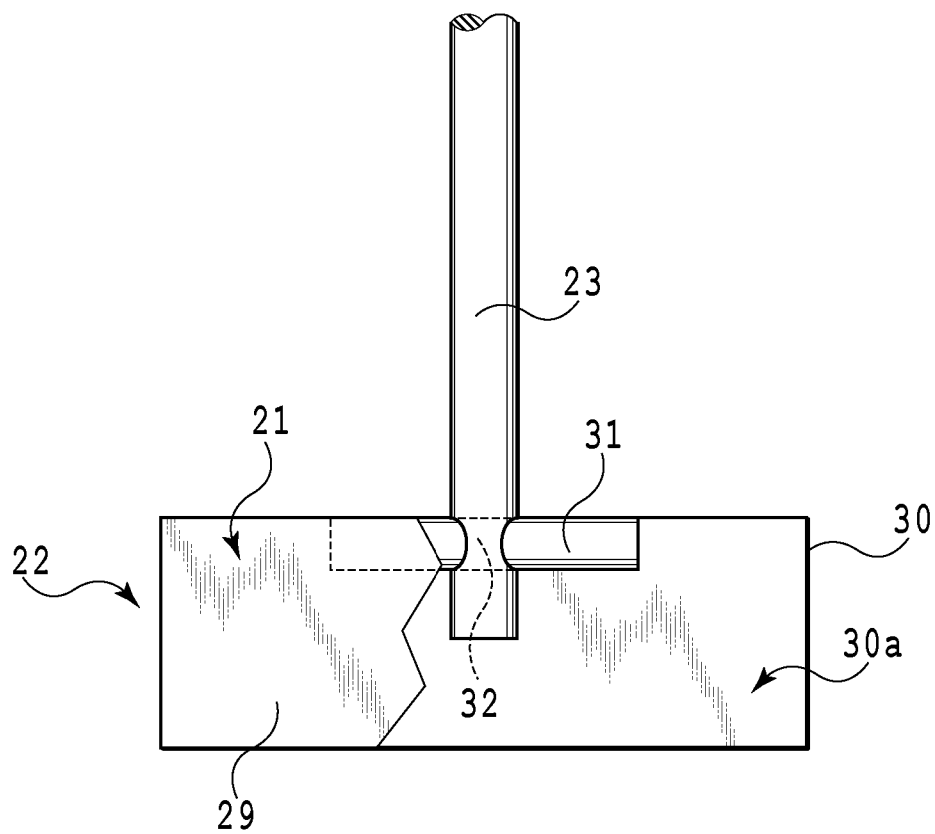
FIG. 29 is an elevational front view illustrating in partially cutaway, the structure of a main portion in another embodiment of the oscillation element.

The outline of a method for assembling the oscillation element according to the present invention, which is schematically shown in FIG. 27, is illustrated in FIGS. 23 to 26. A torsion bar, an oscillating member (first and second plates) and a magnet, all of which are components to constitute the oscillation element, are shown in the exploded view in FIG. 23, and the axes (x, y and z) of the three-dimensional coordinate system that represent directions are provided. The parts are assembled in the order shown in FIGS. 23 to 26 to provide the main portion of the oscillation element. Examples of arrangement for magnet that is embedded within the oscillating member included in the oscillation element are schematically shown in FIGS. 27 to 29.

In the embodiment shown in FIGS. 23 to 26, a wire rod consisting of a work-hardened and age-hardened Co—Ni base alloy, which will be described later, is employed to form a torsion bar 23 that constitutes an oscillating member 17. More specifically, the above described wire rod SPRON 510 having a diameter of 300 µm is employed as a material for the torsion bar 23. It should be noted that the material for the torsion bar 23 is not limited to the wire rod, but also a plate-shaped material may be employed.

A magnet 31 employed has a cylindrical shape, and has a diameter of 200 µm and a length of 2 mm; however, the shape of the magnet 31 is not limited to a cylinder, and may be a prism.

Figure 23:
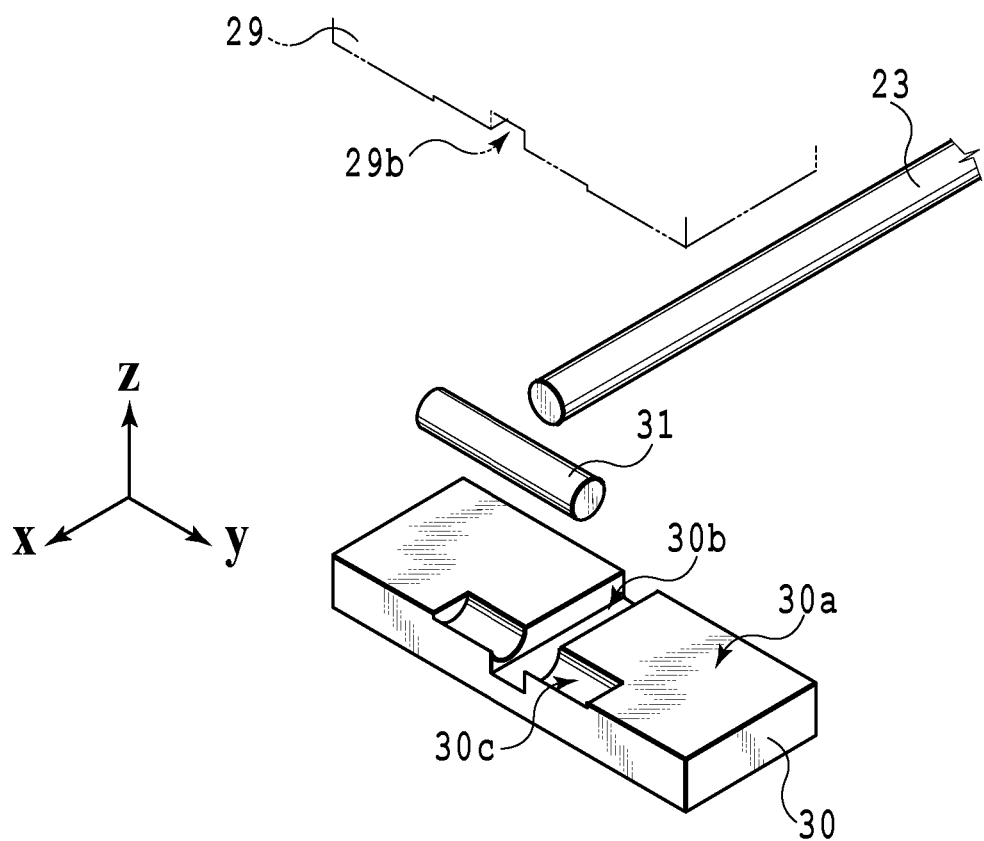
FIG. 23 is a perspective projection showing, together with FIGS. 24 to 26, the procedures for manufacturing the oscillation element shown in FIGS. 19 and 20.
Figure 24:
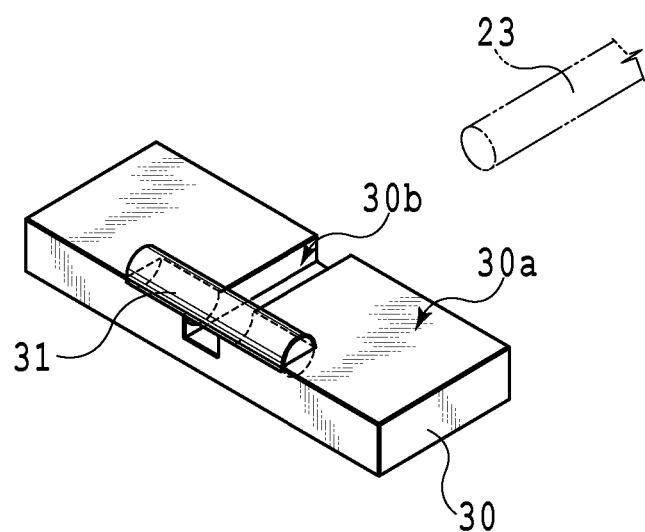
FIG. 24 is a perspective projection showing, together with FIGS. 23, 25 and 26, the procedures for manufacturing the oscillation element shown in FIGS. 19 and 20.
Figure 25:
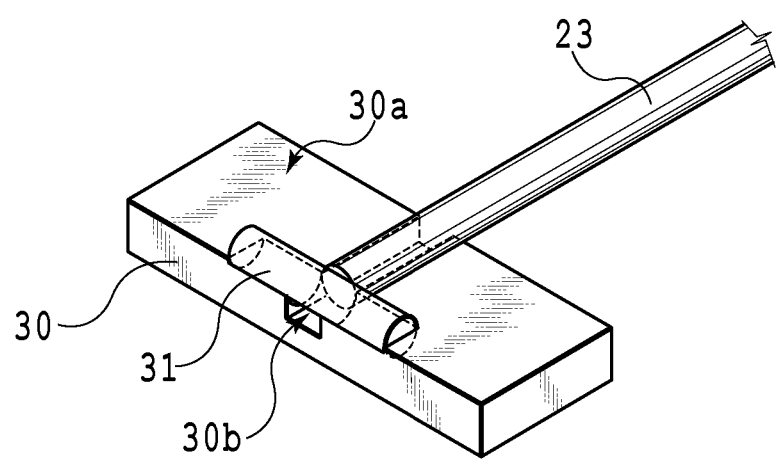
FIG. 25 is a perspective projection showing, together with FIGS. 23, 24 and 26, the procedures for manufacturing the oscillation element shown in FIGS. 19 and 20.
Figure 26:
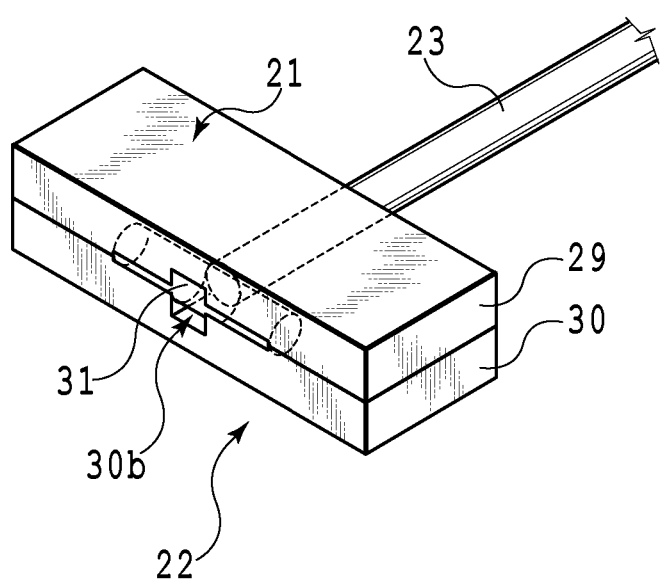
FIG. 26 is a perspective projection showing, together with FIGS. 23 to 25, the procedures for manufacturing the oscillation element in FIGS. 19 and 20.

As well as in the above described embodiments, an oscillating member 22 included in the oscillation element 17 includes first and second plates 29 and 30 having the same size and shape. The first and second plates 29 and 30 are prepared by employing a Si wafer having a thickness of 300 µm. The first and second plates 29 and 30 are shaped like rectangles that are 1 mm long in the x direction and 3 mm in the y direction. Torsion bar receiving grooves 29b and 30b and magnet receiving grooves 29c and 30c (only the magnet receiving groove 30c is shown) are formed, respectively, on joining surfaces 29a and 30a of the first and second plates 29 and 30 that constitute the oscillating member 22. The torsion bar receiving grooves 29b and 30b are provided substantially in the center portion of the joining surface 29b of the first plate 29 so as to extend in the longitudinal direction along the x axis. The magnet receiving groove 30c is provided on the front portion (the x axial direction in FIG. 23) of the joining surface 30a of the second plate 30 so as to extend in the transverse direction along the y axis. Furthermore, the length of the magnet receiving groove 30c along the y coordinate axis is equal to the length of the magnet 31. The widths of the torsion bar receiving grooves 29b and 30b are equal to the diameter of the torsion bar 23, while the depths of these grooves are ½ of the diameter of the torsion bar 23. Similarly, the width of the magnet receiving groove 30c is equal to the diameter of the magnet 31, and the depth thereof is ½ of the diameter of the magnet 31. Furthermore, the length of the magnet receiving groove 30c of this embodiment is the same as the length of the magnet 31. In this embodiment, the magnet receiving groove 30c are closed at both ends; however, the magnet receiving groove 30c is not limited to this type, and may be formed to pass through the two ends, as shown in the other embodiments. Moreover, the cross-sectional shapes of the torsion receiving grooves 29b and 30b may be rectangular shapes as shown in FIG. 23, or may be semi-circular shapes. Likewise, the cross-sectional shape of the magnet receiving groove 30c may be a semicircular shape shown in FIG. 23, or be a rectangular shape.

As it is understood based on the arrangement described above, the torsion bar receiving grooves 29b and 30b and the magnetic receiving groove 30c in this embodiment orthogonally intersect each other on the joining surfaces 29a and 30a. Of course, the magnet receiving groove 29c (not shown) having the same size and the same shape is formed corresponding to the magnet receiving groove 30c that is provided on the second plate 30.

Next, an assembly method for the oscillation element 17 will be described. The torsion bar 23, the first and second plates 29 and 34a that constitute the oscillating member 22 and the magnet 31 are prepared. At this time, the torsion bar receiving grooves 29b and 30b and the magnet receiving grooves 29c and 30c that orthogonally intersect each other are formed, respectively, on the joining surfaces 29a and 30a of the first and second plates 29 and 34a in the longitudinal and transverse directions.

Sequentially, the magnet 31 is fitted into the magnet receiving groove 30c of the second plate 30 that is a part of the oscillating member 22, and therefore, the magnet 31 is positioned at a predetermined location, with respect to the oscillating member 22. Thereafter, the distal end of the torsion bar 23 is brought in contact with the side face of the magnet 31 by employing the magnet 31 positioned in place as a reference, and the torsion bar 23 is fitted in the torsion receiving groove 30b of the second plate 30. Therefore, the distal end of the torsion bar 23 is positioned at a predetermined location with respect to the oscillating member 22. As a result, the torsion bar 23 is arranged, so that the longitudinal axis A of the torsion bar 23 is perpendicular to the longitudinal direction of the oscillating member 22. Finally, the joining surface 29a of the first plate 29 is aligned with the joining surface 30a of the second plate 30, and the first plate 29 is bonded to the second plate 30, so that the torsion bar 23 and the magnet 31 are sandwiched between the joining surfaces. At this time, the exposed, upper half portion of the torsion bar 23 is held in the torsion bar receiving groove 29b, which is provided on the first plate 29, while the exposed upper half portion of the magnet 31 is held in the magnet receiving groove 30b of the second plate 30.

Through this process, the torsion bar 23, the oscillating member 22 and the magnet 31 are accurately positioned at predetermined locations, with respect to each other, and the magnet 31 is embedded inside the oscillating member 22. It should be noted that, as shown in FIGS. 27 to 29, the magnet 31 can be arranged at a predetermined location along the x axis, with respect to the oscillating member 22. For example, the magnet 31 is located at the front end in FIG. 27, in the center portion in FIG. 28, and at the rear end in FIG. 29. In a case wherein the magnet 31 is located in the center of the oscillating member 22 as shown in FIG. 28, the structure as in the embodiment in FIGS. 2 to 5, for example, can also be provided. Further, in a case wherein the magnet 31 is located at the rear end of the oscillating member 22, the structure as in the embodiment in FIGS. 9 and 10 can also be provided. It can be understood for either of the cases shown in FIGS. 27 to 29 that the torsion bar 23 is located perpendicular to the magnet 31, i.e., perpendicular to the longitudinal direction of the oscillating member 22.

Meanwhile, since distortion is present more or less for the torsion bar 23, the straightness of the torsion bar 23 is degraded. When such distortion is present on the torsion bar 23, smooth oscillating motion of the oscillating member 22, supported by the torsion bar 23, is degraded, and as a result, the deflection angle α at the light reflection surface 21 is reduced, with respect to supplied energy. In other words, when the oscillating member 22 is fixed to the distorted torsion bar 23, the longitudinal axis A of the torsion bar 23 does not match the ideal oscillation axis, and therefore, abnormal vibrations tends to occur on the oscillating member 22. Therefore, in order to oscillate the light reflection surface 21 of the oscillating member 22 at a desired deflection angle α, a larger amount of electric energy must be supplied to the sheet coil 26.

A possible countermeasure for distortion of the torsion bar 23 is that, as shown in FIGS. 3 to 5, the gravity center compensation member 24 should be additionally provided in the oscillating member 22. Specifically, the gravity center compensation member 24 having a different weight is bonded to the surface of the second plate 30 of the oscillating member 22 in order to change the location of the center of gravity of the oscillating member 22, as shown in FIG. 3. Thus, the distortion of the torsion bar 23 can be reduced, and as a result, the longitudinal axis A of the torsion bar 23 can match the ideal oscillation axis.

According to the present invention, assembly of the oscillation element can be simplified, and the accuracy for positioning of the components, such as the torsion bar, the oscillating member and the magnet, that constitute the oscillation element can be improved. Furthermore, since the magnet is embedded within the oscillating member, direct adhesion of floating matter, such as dust, can be suppressed, or prevented. Moreover, when the positioning accuracy is improved, displacement of the center of gravity of the entire oscillation element can also be reduced, and therefore, the optical scanning device that can perform stable optical scanning, and the image forming apparatus and the image projection apparatus that employ this optical scanning device can be provided.

According to all of the above described embodiments, the cantilevered torsion bar 23 has been described; however, both longitudinal ends of the torsion bar 23 may be fixed between the frame member 28 and the cover member 25 so that oscillating member 22 is fixed in the center of the torsion bar.

Figure 30:
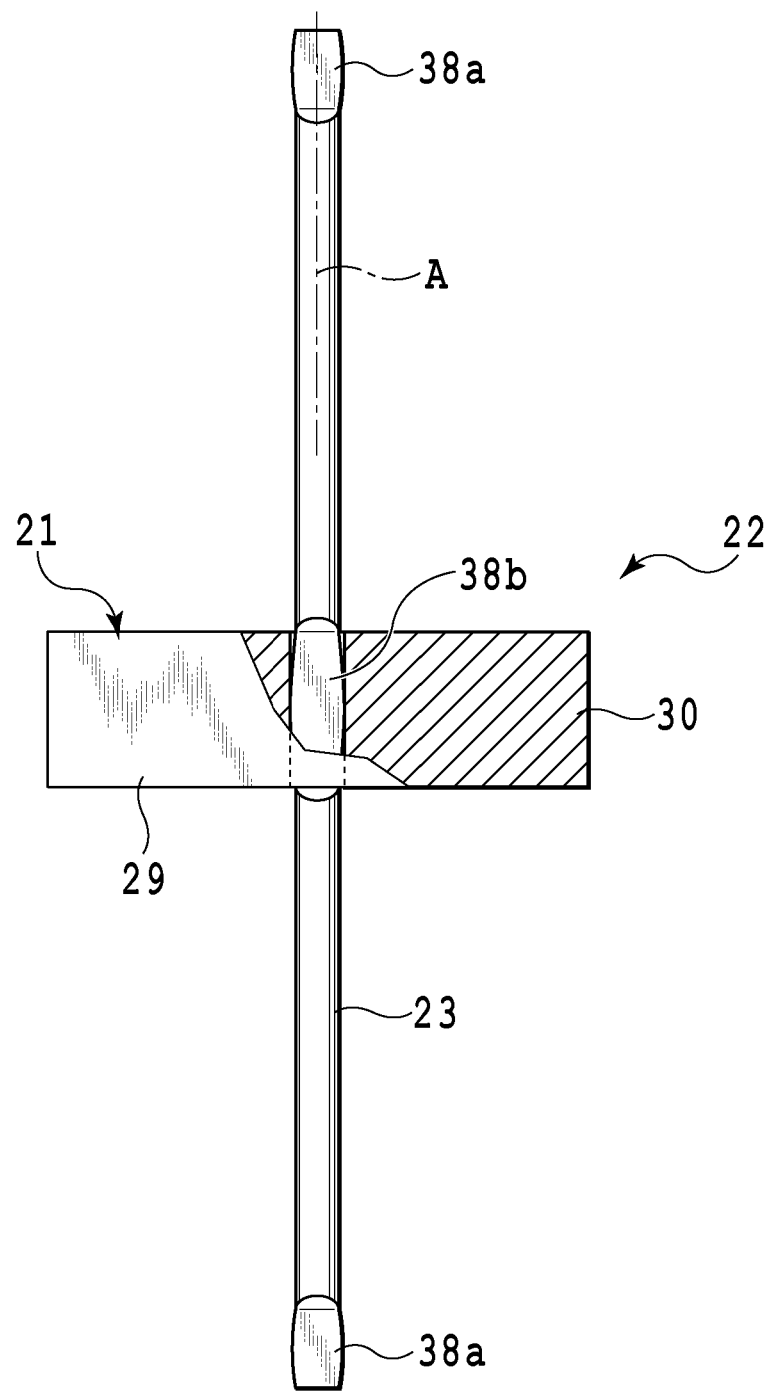
FIG. 30 is an elevational front view illustrating in partially cutaway, the structure of a main portion in a further embodiment of the oscillation element.
Figure 31:
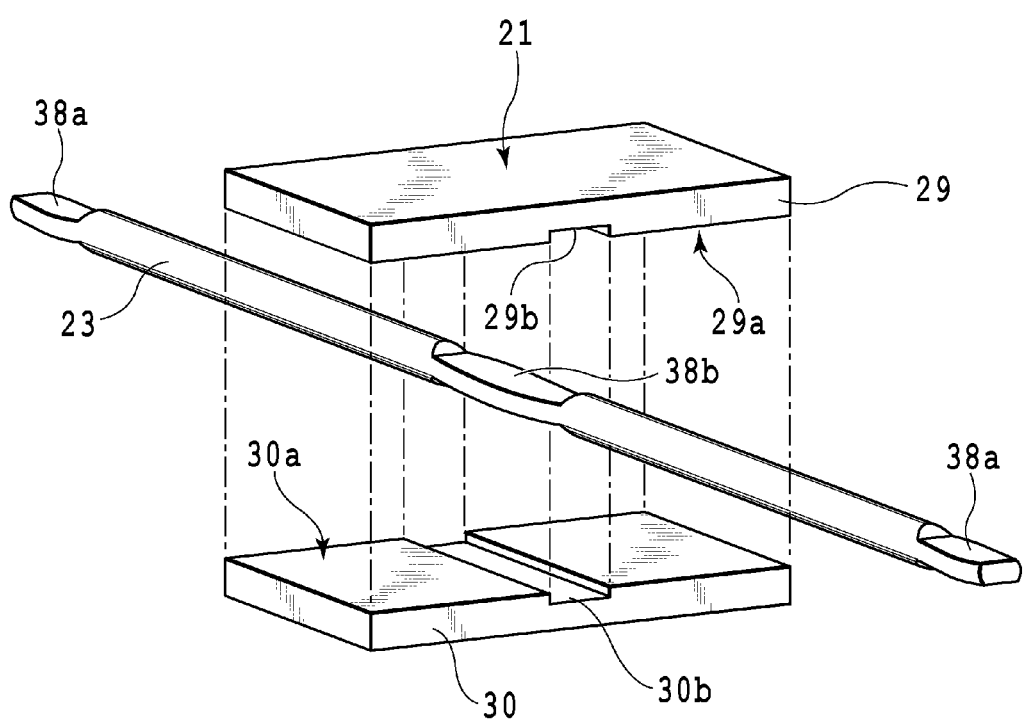
FIG. 31 is an exploded view of the embodiment shown in FIG. 30.

The plan view of the main portion for another embodiment for such an oscillation element 17 according to the present invention is shown in FIG. 30, and the exploded view of the external appearance is shown in FIG. 31; however, the same reference numerals are only provided for the components having the same functions as those for the previous embodiments, and no further explanation for them will be given.

A torsion bar 23 according to this embodiment is formed of a wire rod having a circular cross section, and flat portions 38a that serve as fixing portions for a frame member 28 and a cover member 25 are provided at the two longitudinal ends, while flat portions 38b that serve as joining portions for an oscillating member 22 are formed in the longitudinal center portion. These flat portions 38a and 38b have a rotation symmetrical structure employing a longitudinal axis A of the torsion bar 23 as the axis of symmetry, and each include a pair of flat surfaces that are parallel to each other, while the flat surfaces of both the flat portions 38a and 38b are parallel to each other. Since the flat portions 38a and 38b are provided as joining portions with respect to the oscillating member 22, the torsion bar 23 is more closely coupled with the oscillating member 22 than in a case wherein the oscillating member 22 is joined with the circular cross-sectional portion of the torsion bar 23, and as a result, separation or displacement of the oscillating member 22 with respect to the torsion bar 23 seldom occurs, and a stable vibration property can be obtained. Additionally, since the flat portions 38a that serve as the fixing portions for the torsion bar 23 match in phase the flat portions 38b that serve as the joining portions, the direction of the oscillating member 22 relative to the frame member 28 can be easily designated.

The oscillating member 22 in this embodiment includes two rectangular plates 29 and 30 having the same shape and the same size bonded together by sandwiching the flat portions 38b of the torsion bar 23 in between, and these two plates 29 and 30 have a symmetrical shape that the longitudinal axis A of the torsion bar 23 serves as the axis of symmetry. Torsion bar receiving grooves 29b and 30b, the shape of which substantially corresponds to the cross-sectional shape of the flat portions 38b, are provided on the joining surfaces 29a and 30a of the two plates 29 and 30. In a case wherein the plates 29 and 30 are boned together by sandwiching the flat portions 38b of the torsion bar 23, the bottom faces of the torsion receiving grooves 29b and 30b are closely joined with the surfaces of the flat portions 38b. For bonding these components, various methods described in the above embodiments may be properly employed.

It should be note that the plates 29 and 30 can also be jointed together without forming the torsion receiving grooves 29b and 30b, and a magnet (not shown) is mounted to the oscillating member 22 or the torsion bar 23 by employing the structure of one of the previously described embodiments.

A material as used in the previously described embodiments can also be employed to configure the torsion bar 23, and the cross-sectional shape of a material is not limited to a circular shape, and a wire rod having a rectangular cross section may also be employed. Furthermore, the material for forming the oscillating member 22 and the structure for the light reflection surface 21 can also be the same as those for the above described embodiment.

An example method for producing the torsion bar 23 that has the flat portions 38a and 38b will now be described. This method is employed for the purpose of efficient production at a low cost for the optical scanning device 17 that can provide a stable vibration property.

The material of the torsion bar 23 before machining is a wire rod having a circular cross section, and in this embodiment, a wire rod having a diameter of 0.24 mm is employed. It is preferable that straightness of the wire rod be corrected before the flat portions 38a and 38b are formed for the material, and therefore, the accuracy of the torsion bar 23 can be more improved. A deformation processing, such as swaging, drawing or ironing, or elimination processing, such as cutting, grinding or wet etching, can be performed to form the flat portions 38a and 38b on the surface of the wire rod. In this embodiment, swaging of the wire rod is performed, along the center axis of the wire rod, by employing a pair of punches where the tool surfaces are arranged opposite each other and in parallel to the direction of the diameter, and thus, the flat portions 38a and 38b that correspond to the tool surfaces of the punches are formed on the wire rod. In this case, it is preferable that the thickness between a pair of the flat portions 38a or 38b be equal to or greater than 40% of the diameter of the wire rod.

In a case wherein a plurality of flat portions 38a and 38b are formed at the same time, the deviation of the flat portions 38a and 38b, with respect to the longitudinal axis A of the torsion bar 23 as a reference, can be minimized, and when the torsion bar 23 is mounted on the base 20 and the cover member 25, the positioning accuracy for these components can also be improved. Further, in a case wherein the deformation processing has been performed, the width of the flat portions 38a and 38b is substantially greater than the diameter of the wire rod, and the close contact with the oscillating member 22 is obtained, compared with when the oscillating member 22 is jointed with the circular cross-sectional portion of the wire rod. As a result, the vibration property can be improved.

Figure 32:
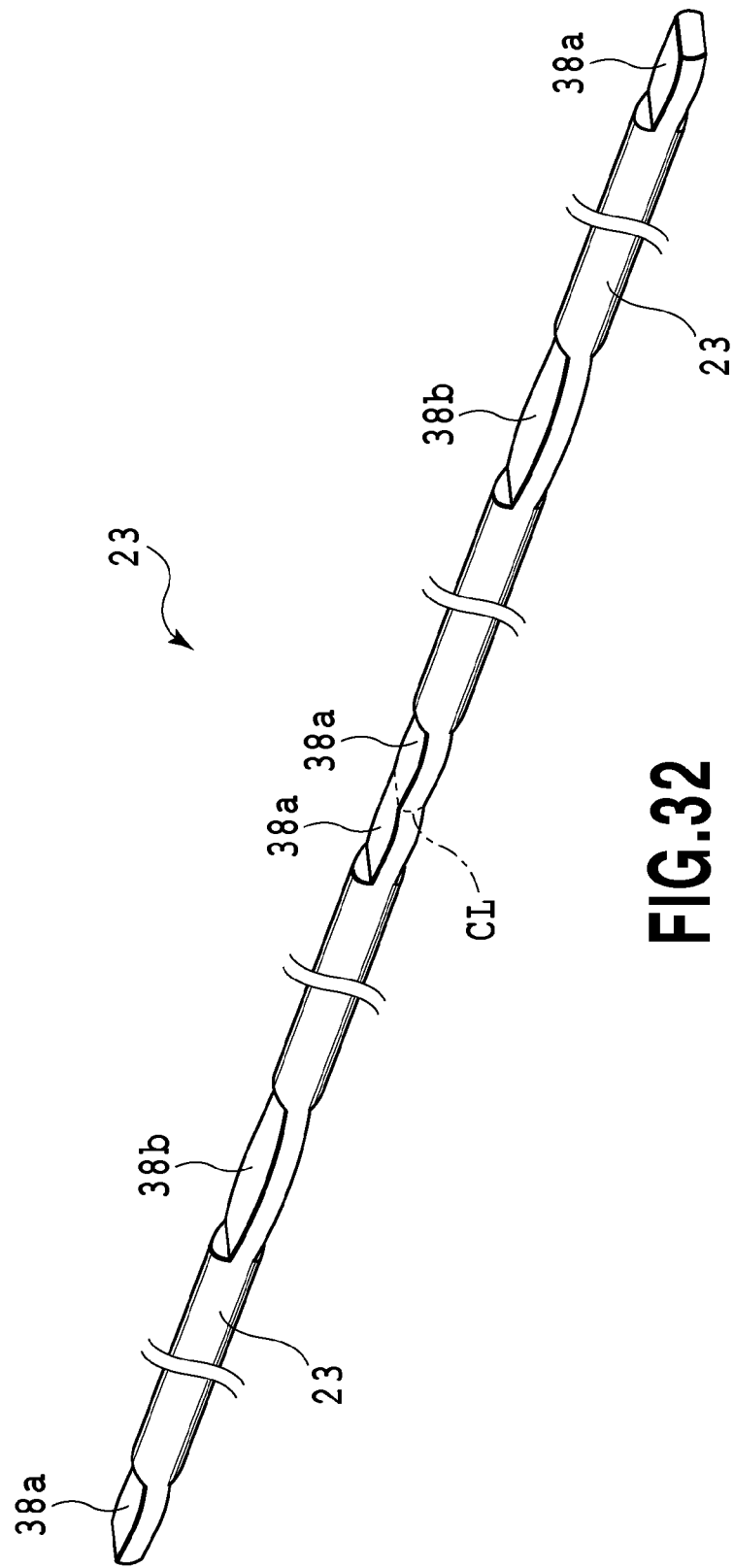
FIG. 32 is a perspective projection illustrating the external appearance of a torsion bar during the manufacturing process that is used in the embodiment in FIG. 30.

The external appearance of a wire rod, where a plurality of flat portions 38a and 38b are formed at predetermined intervals, is shown in FIG. 32. While taking into account the size and the shape of a desired torsion bar 23, a wire rod is cut, along a cutting line $C_L$, at the longitudinal center portions of the flat portions 38b, with a right angle relative to the longitudinal axis, and the remaining flat portions 38a and 38b after cutting can be employed as the fixing portions and the joining portions described above. When the wire rod where multiple flat portions 38a and 38b are formed in places at predetermined intervals in the longitudinal direction of the wire rod is appropriately cut into segments, multiple torsion bars 23 can be obtained from a single wire rod, without disposing of any portion of the wire rod.

Further, the age hardening treatment may be given after the flat portions 38a and 38b have been formed. The age hardening treatment here is a process in which a heating process for the flat portions 38a and 38b and a heating process for the other portions are performed under different temperature conditions. When the age hardening treatment is given, the Young's modulus of the torsion bar 23 can be increased more, and further, distortion of the flat portions 38a and 38b can be more reduced. However, it should be noted that, when this heating process is performed for the torsion bar material before the flat portions 38a and 38b are formed, there is probability that workability for the material will be degraded, or distortion of the flat portions 38a and 38b that have been formed will be increased.

Since the flat portions 38a and 38b are formed by performing swaging for the wire rod, without the membrane deposition process that requires a high cost and a long period of time, a large quantity of torsion bars 23, for which only little characteristic variation is present, can be easily produced.

Figure 33:
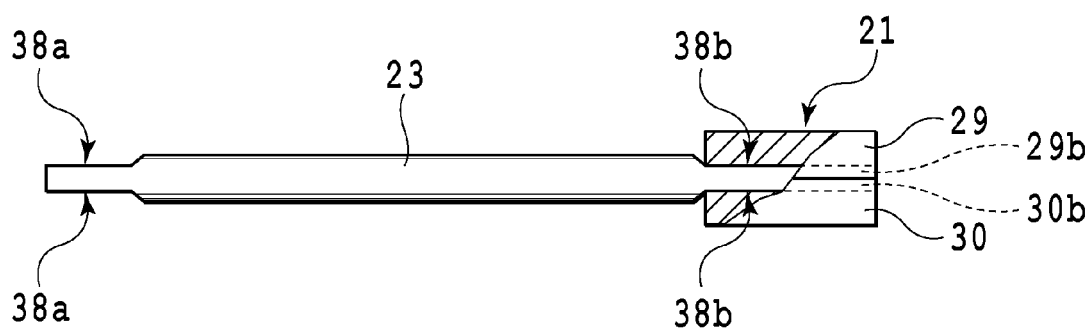
FIG. 33 shows a side view of a main portion in yet another embodiment of the oscillation element using the torsion bar shown in FIG. 32.
Figure 34:
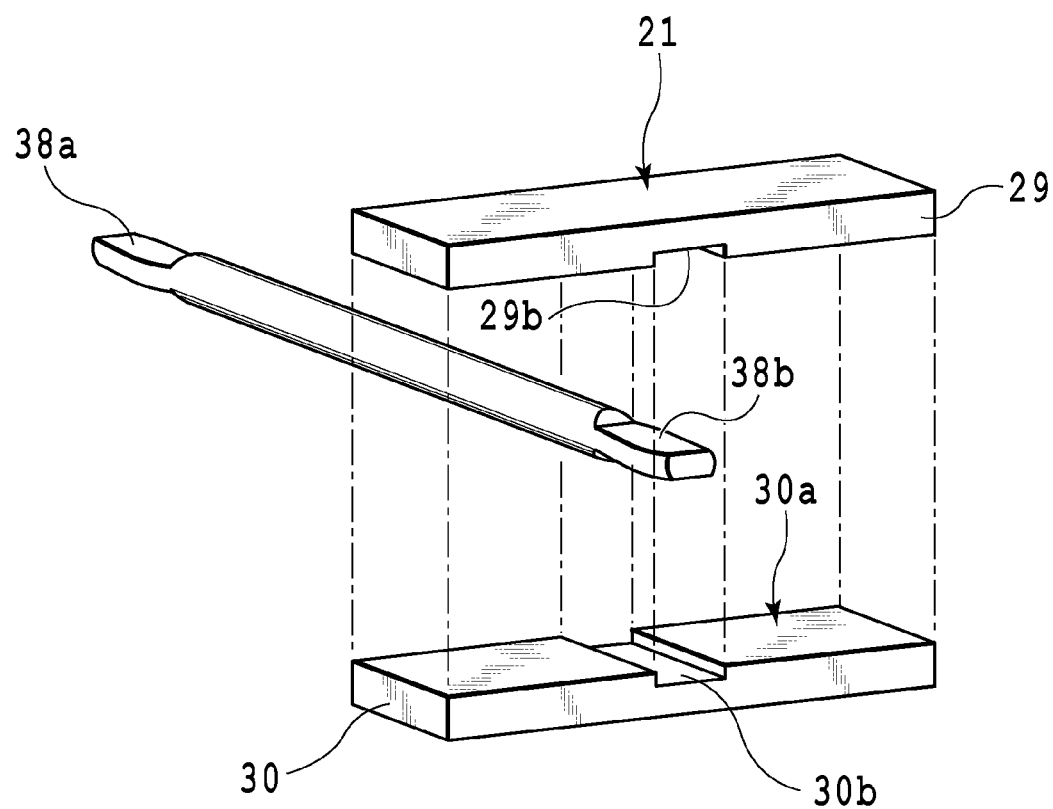
FIG. 34 is an exploded view showing the embodiment in FIG. 33.

The torsion bar 23 that includes the flat portions 38a and 38b can also be applied for a cantilever type in the above described embodiment. The side view of the main portion for this type is shown in FIG. 33, and the exploded view for the structure is shown in FIG. 34. The same reference numerals are only provided for the components having the same functions as those for the above embodiments, and no further explanation for them will be given.

With a torsion bar 23 in this embodiment, flat portions 38a and 38b are formed only at the both ends, and the flat portions 38a on the proximal end serve as fixing portions for a base 20 and a cover member 25, while the flat portions 38b at the distal end serve as joining portions for an oscillating member 22. In this embodiment, detachment or displacement of the oscillating member 22, with respect to the torsion bar 23, also seldom occurs, and a stable vibration property can be obtained. Furthermore, since the flat portions 38a used as the fixing portions of the torsion bar 23 match in phase the flat portions 38b used as the joining portions, the direction of the oscillating member 22 relative to a frame member 28 can be easily designated.

In order to examine temporal reliability for the two types of optical scanning elements 17 shown in FIGS. 30 and 33, the reliability test was conducted by driving the optical scanning elements 17 continuously for 2000 hours under a condition where the resonant frequency was 2 kHz, the drive frequency was around 2 kHz, and the deflection angle was fixed to ±40 degrees. As a result, although the resonant frequency was shifted by several Hz to the low frequency side, favorable reliability was confirmed. Further, abnormal vibrations did not occur. As a result, in this embodiment, the optical scanning element 17 that can provide stable vibration property can be efficiently produced at a low cost.

Figure 35:
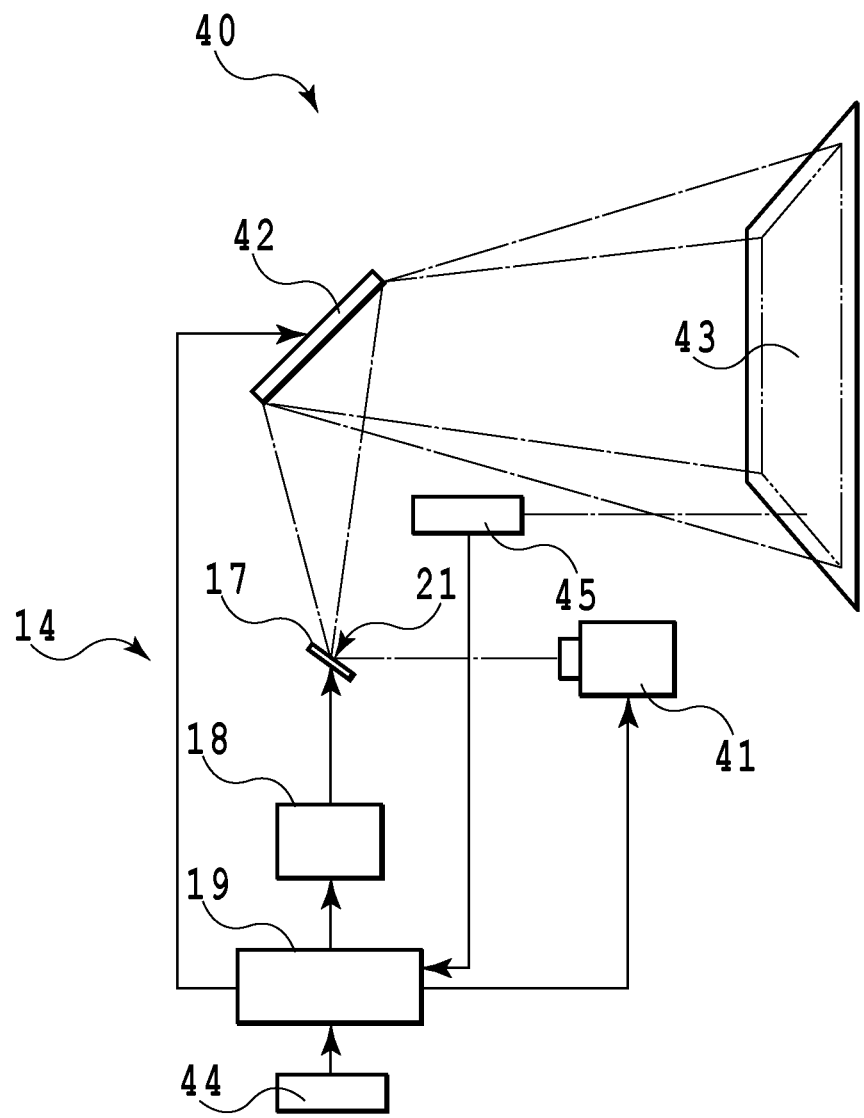
FIG. 35 shows a schematic diagram in one embodiment of an image projection apparatus according to the present invention.

The present invention can also be applied for an image projection apparatus, such as an overhead projector, and the concept of yet one more embodiment according to the present invention is shown in FIG. 35; however, the same reference numerals are only provided for the components having the same functions as those for the above described embodiments, and no further explanation for them will be given. That is, an image projection apparatus 40 in this embodiment includes an optical scanning device 14 having the same basic structure as that for the above described embodiment, a light deflector 42 that deflects, to a predetermined direction, light emitted from a light source 41; and a screen 43 irradiated with light deflected by the light deflector 42.

The light deflector 42 deflects, in a direction parallel to a longitudinal axis A of a torsion bar, light that was emitted from the light source 41 and was reflected at a light reflection surface 21 of an oscillating member 22 of an optical scanning element 17 in the optical scanning device 14. Since the light deflection velocity provided by the light deflector 42 can be slower than the period of vibration of the oscillating member (not shown) of the optical scanning element 17, a well-known galvanometer mirror is used in this embodiment.

Light that is emitted from the light source 41 and that includes the three primary colors, RGB, is controlled in two dimensions by the optical scanning element 17 and the light deflector 42, and thereafter, is applied to the screen 43.

The deflection angle α at the light reflection surface 21 of the oscillating member 22, which constitutes the main portion of the optical scanning element 17, is adjusted by an element driver 18 based on a control signal output by a controller 19. Likewise, for the light deflector 42, the output of the controller 19 is employed to adjust the deflection angle of the galvanometer mirror about the axis of the oscillating member 22 that is orthogonal to the longitudinal axis A of the torsion bar. The controller 19 receives, from an input unit 44, image information to be projected on the screen 43, and also receives, from a distance measurement unit 45, information related to the distance of an optical path extended from the light source 41 to the screen 43. The controller 19 changes the scan angles of the optical scanning element 17 and the light deflector 42 based on the view of angle and the rate of magnification that are designated in accordance with information received from the input unit 44 and the distance measurement unit 45, and based on the size of an image and the aspect ratio of the image. It should be noted that the rate of magnification of an image can be set by turning on/off the power of the light source 41, without changing of the scan angle being required. However, when the length of the OFF period for the light source is reduced by changing the scan angle, a high-luminance image can be projected on the screen 43.

For the image projection apparatus 40 in this embodiment, since the oscillating member 22 is fixed to the work-hardened and age-hardened torsion bar 23 formed of a Co—Ni base alloy, not only the size of the apparatus can be reduced, but also operating instability, such as the occurrence of jitter, can be reduced, and a stable operation can be performed even when the scan angle is changed. Furthermore, since the strain amplitude dependence of the vibration damping ratio is small, a sharp increase of power consumption does not occur in a case wherein the scan angle is increased. Further, the drive power of the light source 41 can be reduced by effective use of light. Therefore, not only the size of the apparatus, but also the capacitance of the element driver 18 and the light source can be reduced, so that a small, high-performance image projection apparatus 40 that provides a large angle of view can be provided.

As described above, the present invention should be interpreted only based on the matters described in the claims of the present invention, and in addition to the contents described in the embodiments, various modifications and alterations that are included in the concept of the present invention can also be provided for the above described embodiments. That is, all of the matters included in the above described embodiments are provided not in order to limit the present invention, but cover all of the structures that are not directly related to the present invention, and these embodiments can be arbitrarily changed in accordance with the usages or the purposes of the structures.

REFERENCE SIGNS LIST

10: LBP (Laser Beam Printer)
11: photosensitive drum
12: exposure unit
13: laser oscillator
14: optical scanning device
15: collimation optics
16: fθ lens
17: optical scanning element
18: element driver
19: controller
20: base
21: light reflection surface
22: oscillating member
23: torsion bar
23a, 23b: torsion bar piece
24: gravity center compensation member
25: cover member
26: sheet coil
27: substrate
28: frame member
29, 30: plate
29a, 30a: joining surface
29b, 30b: torsion bar receiving groove
29c, 30c: magnet receiving groove
31: magnet
31a: hole
32: hole
33: glass surface plate
34: BD sensor
35: control unit
36: stopper portion
37: notch portion
38a, 38b: flat portion
40: image projection apparatus
41: light source
42: light deflector
43: screen
44: input unit
45: distance measurement unit
A: longitudinal axis of a torsion bar
$A_R$: ideal oscillation axis
α: deflection angle
$C_S$, $C_{Sa}$: die mark
$C_L$: cutting line
G: center of gravity of an oscillating member
h: height from the surface of a glass surface plate to the center of gravity of an oscillating member
L: laser beam
O: center for mounting the proximal end of a torsion bar to a base
S: internal space

The invention claimed is:

1. An oscillation element comprising:
a base;
a torsion bar protruding from the base; and
an oscillating member arranged on a side of the torsion bar away from the base, the oscillating member having two plates, each of the two plates having a same shaped groove, and the two plates being joined together so that the two plates sandwich the torsion bar within the grooves.

2. The oscillation element as claimed in claim 1, wherein the oscillating member has a light reflection surface for reflecting light emitted from a light source, the light reflection surface being extended in parallel to a longitudinal axis of the torsion bar, and wherein the oscillating member oscillates about the longitudinal axis with an elastic deformation of the torsion bar, thereby deflecting the light reflected on the light reflection surface of the oscillating member in a direction intersecting the longitudinal axis of the torsion bar.

3. The oscillation element as claimed in claim 2, wherein the light reflection surface of the oscillating member is provided on a side opposite the joining surface of at least one of the two plates.

4. The oscillation element as claimed in claim 1, further comprising a gravity center compensation member for compensating the center of gravity of the oscillating element and the center of gravity of the torsion bar.

5. An optical scanning device comprising:
an oscillation element as claimed in claim 4;
a light source for emitting light to a light reflection surface on the oscillating member of the oscillation element; and
drive means for oscillating the oscillating member of the oscillation element about a longitudinal axis of a torsion bar.

6. An image forming apparatus comprising:
an optical scanning device as claimed in claim 5; and
an image forming medium that is irradiated with light emitting from the light source of the optical scanning device, via the light reflection surface on the oscillating member of the oscillation element of the optical scanning device.

7. An image projection apparatus comprising:
an optical scanning device as claimed in claim 5;
a light deflector for deflecting, in a direction parallel to a longitudinal axis of a torsion bar, light that is emitted from the light source and is reflected by the light reflection surface on the oscillating member of the oscillation element of the optical scanning device; and
a screen irradiated by the light deflected by the light deflector.

8. The oscillation element as claimed in claim 1, wherein the oscillating member has a notch portion provided therein as a reference for mounting a magnet.

9. An optical scanning device comprising:
an oscillation element as claimed in claim 1;
a light source for emitting light to a light reflection surface on the oscillating member of the oscillation element; and
drive means for oscillating the oscillating member of the oscillation element about a longitudinal axis of a torsion bar.

10. The optical scanning device as claimed in claim 9, wherein the drive means includes a magnet integrally mounted with the oscillating member, and a coil for passing an alternating current, the coil being located opposite the magnet, and wherein the two plates have grooves respectively provided on joining surfaces of the two plates for receiving or holding the magnet, the grooves being symmetrical so that the longitudinal axis of the torsion bar serves as the axis of symmetry.

11. The optical scanning device as claimed in claim 9, wherein magnet poles of the magnet are extended perpendicular to the longitudinal axis of the torsion bar, and parallel to the light reflection surface of the oscillating member.

12. An image forming apparatus comprising:
an optical scanning device as claimed in claim 9; and
an image forming medium that is irradiated with light emitted from the light source of the optical scanning device, via the light reflection surface on the oscillating member of the oscillation element of the optical scanning device.

13. An image projection apparatus comprising:
an optical scanning device as claimed in claim 9;
a light deflector for deflecting, in a direction parallel to a longitudinal axis of a torsion bar, light that is emitted from the light source and is reflected on the light reflection surface on the oscillating member of an oscillation element of the optical scanning device; and
a screen irradiated by the light deflected by the light deflector.

14. An oscillation element comprising:
a base;
a torsion bar protruding from the base; and
an oscillating member arranged on a side of the torsion bar away from the base, the oscillating member having two plates that are joined together so that the two plates sandwich the torsion bar, the two plates having (i) grooves respectively provided on joining surfaces of the two plates for receiving the torsion bar and (ii) a symmetrical shape with a longitudinal axis of the torsion bar serving as the axis of symmetry.

15. An optical scanning device comprising:
an oscillation element as claimed in claim 14;
a light source for emitting light to a light reflection surface on the oscillating member of the oscillation element; and
drive means for oscillating the oscillating member of the oscillation element about a longitudinal axis of a torsion bar.

16. An image forming apparatus comprising:
an optical scanning device as claimed in claim 15; and
an image forming medium that is irradiated with light emitting from the light source of the optical scanning device, via the light reflection surface on the oscillating member of the oscillation element of the optical scanning device.

17. An image projection apparatus comprising:
an optical scanning device as claimed in claim 15;
a light deflector for deflecting, in a direction parallel to a longitudinal axis of a torsion bar, light that is emitted from the light source and is reflected by the light reflection surface on the oscillating member of the oscillation element of the optical scanning device; and
a screen irradiated by the light deflected by the light deflector.

18. An oscillation element comprising:
a torsion bar;
an oscillating member fixed to the torsion bar;
first magnetic field generation means fixed to the oscillating member or the torsion bar; and
second magnetic field generation means for generating a magnetic field corresponding to a magnetic field generated by the first magnetic field generation means, so that the torsion bar is deformed and the oscillating member is oscillated;
wherein the torsion bar has a flat portion that is formed on a part of a straight wire rod having a definite shape in cross section, and
wherein the oscillating member has a groove for receiving the torsion bar, the torsion bar being joined to the oscillating member so that the flat portion is received within the groove.

19. An optical scanning device comprising:
an oscillation element as claimed in claim 18;
a light source for emitting light to a light reflection surface on the oscillating member of the oscillation element; and
drive means for oscillating the oscillating member of the oscillation element about a longitudinal axis of a torsion bar.

20. An image forming apparatus comprising:
an optical scanning device as claimed in claim 19; and
an image forming medium that is irradiated with light emitting from the light source of the optical scanning device, via the light reflection surface on the oscillating member of the oscillation element of the optical scanning device.

21. An image projection apparatus comprising:
an optical scanning device as claimed in claim 19;
a light deflector for deflecting, in a direction parallel to a longitudinal axis of a torsion bar, light that is emitted from the light source and is reflected by the light reflection surface on the oscillating member of the oscillation element of the optical scanning device; and
a screen irradiated by the light deflected by the light deflector.

22. An oscillation element comprising:
a base;
a torsion bar protruding from the base;
an oscillating member arranged on a side of the torsion bar away from the base, the oscillating member having two plates that are joined together so that the two plates sandwich the torsion bar, the two plates having the same shape; and
a gravity center compensation member for compensating the center of gravity of the oscillating element and the center of gravity of the torsion bar.

* * * * *